United States Patent
Stern et al.

(10) Patent No.: US 9,614,862 B2
(45) Date of Patent: Apr. 4, 2017

(54) SYSTEM AND METHOD FOR WEBPAGE ANALYSIS

(71) Applicant: NICE-SYSTEMS LTD., Ra'anana (IL)

(72) Inventors: Nir Stern, Tel Aviv (IL); Shlomo Cohen Ganor, Beit Zayit (IL); Rotem Farkash, Hod HaSharon (IL)

(73) Assignee: NICE LTD., Ra'anana (IL)

( * ) Notice: Subject to any disclaimer, the term of this patent is extended or adjusted under 35 U.S.C. 154(b) by 224 days.

(21) Appl. No.: 13/949,570

(22) Filed: Jul. 24, 2013

(65) Prior Publication Data

US 2015/0033331 A1    Jan. 29, 2015

(51) Int. Cl.
- *H04L 29/06* (2006.01)
- *G06F 12/14* (2006.01)
- *G06F 17/22* (2006.01)

(52) U.S. Cl.
CPC .......... *H04L 63/1425* (2013.01); *G06F 12/14* (2013.01); *G06F 17/22* (2013.01); *H04L 29/06* (2013.01)

(58) Field of Classification Search
CPC .......... H04L 63/00; H04L 29/00; G06F 17/30
See application file for complete search history.

(56) References Cited

U.S. PATENT DOCUMENTS

| | | | | |
|---|---|---|---|---|
| 8,407,790 B2* | 3/2013 | Mony | ................... | G06F 21/566 726/22 |
| 8,615,800 B2* | 12/2013 | Baddour et al. | ................. | 726/22 |
| 8,700,588 B2* | 4/2014 | Henkin | ............. | G06F 17/30867 707/705 |
| 8,806,646 B1* | 8/2014 | Daswani et al. | ................. | 726/25 |
| 2010/0235402 A1* | 9/2010 | Han et al. | ..................... | 707/802 |

OTHER PUBLICATIONS http://htmlpurifier.org/ HTML_purifier Apr. 27, 2007, 49 pages.*
https://en.wikipedia.org/wiki/Representational_state_transfer From Wikipedia, the free encyclopedia—retrieved from the Internet on May 28, 2015.
http://www.w3schools.com/tags/tag_iframe.asp W3Schools—retrieved from the Internet on May 28, 2015.

\* cited by examiner

*Primary Examiner* — Jeffrey Pwu
*Assistant Examiner* — Wasika Nipa
(74) *Attorney, Agent, or Firm* — Pearl Cohen Zedek Latzer Baratz LLP

(57) ABSTRACT

A system and method for classifying a webpage may include generating, by an analysis server, a first representation of a webpage. A system and method may include generating, by a unit installed in a user web browser, a second representation of the webpage and the method may comprise producing a classification of the webpage by relating the first representation to the second representation.

16 Claims, 17 Drawing Sheets

```
<html>
  <head>
    <title>sample</title>
    <script                                type="text/javascript"
src="something.js"></script>
  </head>
  <body>
    <p id="text">Some text</p>
    <form            id="frmLogin"           method="post"
action="//www.mybank.com/login">
     Username:     <input      type="text"    id="username"
name="username"></input>
      <br/>
      Password:     <input      type="text"    id="password"
name="password"></input>
      <br/>
      <input type="submit" value="Login"></input>
    </form>
  </body>
</html>
```

| Element | Output string | Notes |
|---|---|---|
| <html>...</html> | (empty) | Element is skipped |
| <head>...</head> | (empty) | Element is skipped |
| <title>sample</title> | (empty) | Element is skipped |
| <script type=...></script> | <script type=...></script> | Element is appended to the output string in whole. In this example, the SCRIPT element references an external file. In other examples, the SCRIPT element may include an inline script. |
| <body>...</body> | <script type=...></script> | Element is skipped |
| <p id="text">Some text</p> | <script type=...></script> | Element is skipped |
| <form id=...>...</form> | <script type=...></script><form id=...>...</form> | Element is appended to the output string with its attributes, without its children. |
| <input type=...></input> | <script type=...></script><form id=...>...</form><input type=...></input> | Element is appended to the output string with its attributes (except the "value"), and without its children. |
| ... | | |

```
<script type="text/javascript" src="something.js"></script>
<form            id="frmLogin"            method="post"
action="//www.mybank.com/login"></form>
<input type="text" id="username" name="username"></input>
<input type="text" id="password" name="password"></input>
<input type="submit"></input>
```
~670

```
<script type="text/javascript" src="something.js"></script>
<form id="frmLogin" method="post"
action="//www.mybank.com/login"></form>
<input type="text" id="username" name="username"></input>
<input type="text" id="password" name="password"></input>
<input type="submit"></input>
```
1105

```
<script type="text/javascript" src="something.js"></script>
<form id="frmLogin" method="post"
action="//www.mybank.com/login?lang=es"></form>
<input type="text"    id="username"  name="username"></input>
<input type="text"    id="password"  name="password"></input>
<input type="submit"></input>
```
1110

```
<script type="text/javascript" src="something.js"></script>
<form id="frmLogin" method="post"
action="//www.mybank.com/login"></form>
<input type="text" id="username" name="username"></input>
<input type="text" id="password" name="password"></input>
<input type="text" id="ATMPIN" name="ATMPIN"></input>
<input type="submit"></input>
```
1115

FIG. 11

```
<html>
<head>
        <title>sample</title>
        <script type="text/javascript"
src="something.js"></script>
    </head>
    <body>
        <p id="text">Some text</p>
        <form id="frmLogin" method="post"
action="//www.mybank.com/login">
            Username: <input type="text" id="username"
name="username"></input>
        <br/>
        Password: <input type="text" id="password"
name="password"></input>
        <br/>
        ATM PIN: <input type="text" id="ATMPIN"
name="ATMPIN"></input>
        <br/>
        <input type="submit" value="Login"></input>
    </form>
    </body>
</html>
```
~1305

```
<script type="text/javascript" src="something.js"></script>
<form id="FrmLogin" method="post"
action="//www.mybank.com/login"></form>
<input type="text" id="username" name="username"></input>
<input type="text" id="password" name="password"></input>
<input type="text" id="ATMPIN" name="ATMPIN"></input>
<input type="submit"></input>
```
~1310

FIG. 13

SYSTEM AND METHOD FOR WEBPAGE ANALYSIS

FIELD OF THE INVENTION

The present invention pertains to content analysis, more particularly, to content delivered over a network such as content in a webpage.

BACKGROUND OF THE INVENTION

Delivering content over a network, e.g., delivering webpages over the Internet, is known in the art. However, security and other risks exist. For example, cyber-attacks that include modifying a web page by a "Man in the Middle" or a "Man in the Browser" are known. For example, as known in the art, a "Man in the Browser" may be a program, script or other code executed in a browser that injects Hyper Text Markup Language (HTML) code into a web page thus effectively modifying the original web page sent by a web server. Accordingly, content injection may cause a user be presented with content that is different from the content sent by a website.

Current approaches to content injection detection are mostly based on manual investigation by an expert user who determines if page modifications are malicious or legitimate. Such manual determination is then used to build and update lists of "known good" and "known bad" page signatures. However, due to the constant changes made by attackers in their methods, these approaches require ongoing maintenance and updates that are dependent on trained experts.

SUMMARY OF EMBODIMENTS OF THE INVENTION

According to embodiments of the invention, a system and method for classifying a webpage may include producing, by an analysis server, a baseline pool, the baseline pool including a plurality of representations of a respective plurality of webpages served by a web server. A system and method may include obtaining, from a web browser, a representation of a webpage received by the web browser from the web server. A system and method may include producing, by the analysis server, a classification of the webpage by relating the representation of the webpage to data in the baseline pool.

A system and method may include producing, by a unit in a user web browser, a representation of a webpage. A system and method may include generating, by the unit in the web browser, a unique identification parameter, sending the unique identification parameter to a web server, sending the unique identification parameter and the representation of the webpage to an analysis server and producing, by the analysis server, a pre-classification for the webpage based on the representation of the webpage and storing the pre-classification in association with the unique identification parameter. A system and method may include sending the unique identification parameter from the web server to the analysis server, using the unique identification parameter to locate the pre-classification at the analysis server, and producing the classification based on the pre-classification.

A system and method may include receiving a webpage from a web server by an analysis server, generating, by the analysis server, a representation of the webpage as received by the analysis server and producing a classification of the webpage by relating the representation of the webpage as received by the analysis server to the representation of the webpage as received by the web browser.

A system and method may include producing a classification based on determining an element included in a webpage as received by the web browser is not included in the webpage as received by a controlled browser included in the analysis server. An element included in a web page may be a text string, a value or any other applicable element in a web page. A system and method may include collecting, by a unit in a web browser, device data related to a user computing device; sending the device data to the analysis serve; and using the device data to produce the classification.

A system and method may include collecting, by a unit in the web server, server data related to the web server; sending the server data to the analysis serve; and using the server data to produce the classification. A system and method may include updating a baseline pool based on a representation of the webpage. A system and method may include classifying a webpage received by the web browser as unknown; and based on a frequency of appearance, classifying the webpage received by the web browser as authentic.

A system and method may include generating, by an analysis server, a first representation of a webpage; generating, by a unit installed in a user web browser, a second representation of the webpage; and producing a classification of the webpage by relating the first representation to the second representation. A system and method may include determining an element represented in a first representation of a webpage is not represented in a second representation; and classifying the webpage as suspicious.

A system and method may include sending, by a unit installed in a user web browser, a parameter identifying a webpage to an analysis server and to a web server, the web server serving the webpage; sending the parameter from the web server to the analysis server; and using the parameter, by the analysis server, to locate the classification of the webpage.

A system according to embodiments of the invention may comprise a unit installed in a user web browser, the unit configured to generate a first representation of a webpage. The system may include an analysis server configured to generate a second representation of the webpage and to produce a classification of the webpage by relating the first representation to the second representation. In a system, an analysis server may be configured to determine an element represented in the first representation is not represented in the second representation and classifying the webpage as suspicious. A "unit" installed in a browser may be software or code included in the software or code which makes up the browser, and which is executed by a processor. Thus it may be considered that a unit installed in a browser and the browser may be the processor which executes the unit.

A system may include a unit installed in a user web browser and configured to send a parameter identifying a webpage to an analysis server and to a web server, the web server serving the webpage. An analysis server may be configured to receive the parameter from the web server and to use the parameter to locate the classification of the webpage. In a system, a unit in a web browser may be configured to collect device data related to a user computing device and send the device data to the analysis serve; and an analysis server may be configured to use the device data to produce the classification. In a system, an analysis server may be configured to classify a webpage as unknown and, based on a frequency of appearance, classify the webpage as authentic.

A system may include an analysis server configured to generate a baseline pool by obtaining a plurality of webpages using a controlled web browser and classify the webpage based on the baseline pool. A system may include a unit installed in the web server, the unit configured to collect server data related to a web server and send the server data to the analysis server. An analysis server may be configured to use the server data to produce the classification. A system may include a unit installed in the web browser and configured to collect device data related to a user computing device and send the device data to an analysis serve. The system may include an analysis server configured to use the device data to produce the classification.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 6A shows content of a webpage according to embodiments of the present invention;

FIG. 6B shows output of processing a web page according to embodiments of the present invention;

FIG. 11 shows content of entries in a baseline pool and an input string according to embodiments of the present invention;

FIG. 13 shows content of a webpage and output of processing a web page according to embodiments of the present invention.

Figure 1A:
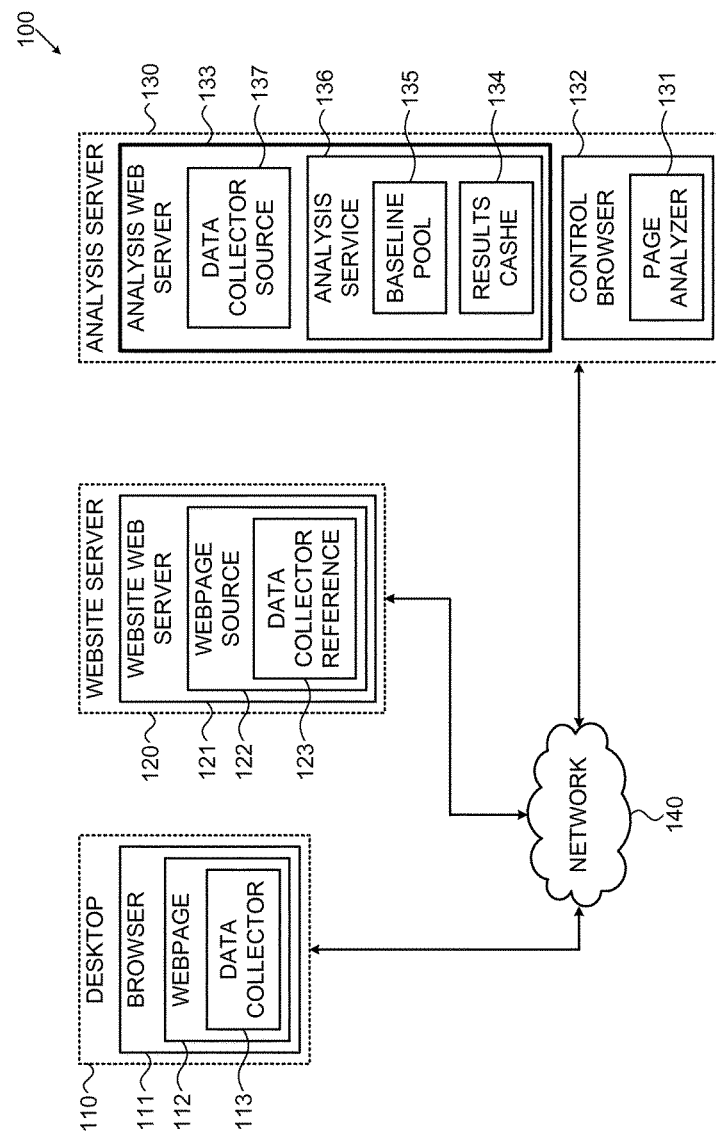
FIG. 1A shows an exemplary system according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those having ordinary skill in the art that the invention may be practiced without these specific details. In other instances, well-known methods, procedures, components, modules, units and/or circuits have not been described in detail so as not to obscure the invention.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like.

Unless explicitly stated, the method embodiments described herein are not constrained to a particular order or sequence. Additionally, some of the described method embodiments or elements thereof can occur or be performed at the same point in time or overlapping points in time. As known in the art, an execution of an executable code segment such as a function, task, sub-task or program may be referred to as execution of the function, program or other component.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Embodiments of the invention may enable automatically identifying changes or modifications made to delivered content such as webpages. As used herein, the terms "web page" and "webpage" refer to the same entity and may be used herein interchangeably. Similarly, the terms "webpages" and "web pages" may be used herein interchangeably. Changes made either on the client side (e.g., by code embedded in a web browser) or en-route (e.g., by a router or other device in a network) may be identified and/or detected. For example, known in the art HTML or JavaScript (JS) injections made by a "Man in the Middle" and/or "Man in the Browser" as part of a cyber-attack may be identified or detected and a web site may be notified. As referred to herein, a JavaScript is a script written according to the Javascript programming language as known in the art. A webpage as referred to herein may be a webpage as known in the art, e.g., a webpage may include a set of HTML elements, images, scripts and the like, typically sent from a web server to a web browser of a user.

An embodiment may analyze a webpage as a set of document fragments, each of which may be "known" or "unknown". An embodiment may mark, label, designate or identify fragments or elements in a webpage as "known" or "unknown". Known fragments may be fragments already classified by a system as either legitimate or malicious and so may not require further classification.

An embodiment may automatically generate a webpage baseline by obtaining a webpage with a controlled or clean (uninfected) module and/or device (e.g., a web browser executed on a controlled or verified to be free of unknown software or modules), extracting document fragments from the webpage, and classifying extracted fragments or elements as legitimate and/or known. New fragments or elements in a webpage that are seen, processed or detected by a system may be classified as legitimate or malicious based on a webpage baseline and/or based on previously classified elements or fragments.

In an embodiment, after generating a webpage baseline, new elements or fragments (e.g., elements that appear in a webpage after the baseline was created) are examined and a baseline for the webpage may be extended or added to. Accordingly, a system may perform automatic learning of elements in a webpage and may identify risks (e.g., injections of malicious elements into a webpage) based on a continuous learning and/or classification of content in the webpage.

Various methods may be used for analyzing a webpage. An embodiment may perform statistical frequency analysis of new or previously unknown document fragments or elements. For example, fragments that start appearing on a large proportion of user devices around the same time are less likely to be malicious and may therefore be considered or classified as legitimate. An embodiment may apply heuristic rules. For example, document fragments that are found in a client-side webpage, and were not present in the original webpage (e.g., as obtained by a controlled (or "clean") device or web browser), may be classified according to their level of risk using various heuristic rules. For example, a new JavaScript code or a new form input field are highly suspicious of being malicious injections as they may be used in order to obtain secret or sensitive information. For example, as known in the art, form input fields in a webpage may be used to obtain a user's password. Other examples of heuristics may be marking, labeling or identifying a uniform (or universal) resource locator (URL) pointing to unrecognized $3^{rd}$ party servers as suspicious. Yet another suspicious element appearing in a webpage may be a structured query language (SQL) element as it may be used for database manipulation as known in the art.

Accordingly, a malicious modification of a webpage made without the consent or knowledge of the webpage server (or website) may be identified and/or detected by a system described herein, and an action may be performed in order to eliminate a risk associated with such malicious modifications. For example, a manager, operator or owner of a website may be informed, by a system, that a webpage sent by the website was modified prior to being presented to a user. Based on indications or alerts provided by a system according to embodiments of the invention, the operator of the website may inform the affected user, block the user from accessing the website or perform any other applicable action.

Accordingly, embodiments of the invention may eliminate the dependency on "experts" and known signatures in order to identify malicious injections of content into a webpage. As described herein, using fully automated self-learning methods, embodiments of the invention may detect injections of malicious code into a webpage. Although webpages are mainly referred to herein it will be understood that any other content delivered over a network may be applicable.

Reference is made to FIG. 1A which shows an exemplary system 100 according to embodiments of the invention. As shown, a system may include a desktop computer (or a functional equivalent, such as a personal computer) 110. As further shown, desktop 110 may include, execute or provide a browser 111 (e.g., a program which when executed displays and accepts input for Internet web pages) and browser 111 may include a webpage 112, e.g., a webpage obtained from website 120. As shown, webpage 112 may include a data collector module or unit 113. As shown, a system may include, or interact with, a website 120 that may be a website as known in the art. As shown, website 120 may include a web server 121 and web server 121 may include a webpage source 122 and a data collector reference 123.

As shown, the system may include an analysis server 130. As further shown, analysis server 130 may execute a controlled browser 132 that may include a page analyzer 131.

As further shown, analysis server 130 may include an analysis web server 133 that may include a data collector source 137. As shown, analysis web server 133 may be included in analysis server 130. In an embodiment and as shown, analysis web server 133 may include an analysis service 136 that may include a results cache object 134 and a baseline pool 135. As shown, the system may include a network 140 that enables components of system 100 to communicate or interact.

Desktop 110 may be any suitable computing device, e.g., a home computer, a smartphone or a tablet computer. Desktop 110 may be any computing device capable of communicating over a network with website 120 and/or with analysis server 130. Desktop 110 may be any computing device capable of receiving content (e.g., receive a webpage that includes text, images and multimedia) from website 120 and presenting the content to a user. For example, desktop 110 may be an end-user's computer connected to the internet as known in the art. Browser 111 may be a web browser as known in the art, e.g., the Internet Explorer (IE) web browser provided by Microsoft. Webpage 112 may be a webpage as known in the art, e.g., an online banking service's login page or account summary page. Data collector 113 may be any suitable unit, module or element. For example, data collector 113 may be a client-side software, for example a JavaScript function executed by browser 111. In an embodiment, data collector 113 is a unit or module that includes executable code and related data and is embedded in a webpage source 122, e.g., by an operator or owner of a website. In an embodiment, data collector 113 executes a data collection function described below.

Website server 120 may be or may include a server computer or a group of computers connected to the internet and providing web services, e.g., providing webpages to users. Generally, website server 120 may include any component required in order to maintain a website on the Internet as known in the art. Website web server 121 may be a web server as known in the art, e.g., an Apache Hypertext Transfer (or Transport) Protocol (HTTP) Server. Generally, website web server 121 may be any server that serves webpages over the internet, specifically HTML webpages over HTTP or secured HTTP (HTTPS).

Webpage Source 122 may be a file or set of files or elements stored on website web server 121 or hosted by website web server 121. For example, webpage source 122 may be an HTML file and one or more JavaScript files, cascading style sheets (CSS) and/or images. Generally, webpage source 122 may include any component or element included in a webpage stored by a server and, upon request, sent to a user's browser for presentation.

Data collector reference 123 may be an HTML element (or other suitable element) included in webpage source 122 and may reference, or point to, data collector source 137. For example, data collector reference 123 may be an HTML script tag as known in the art where the "src" attribute in the tag includes a uniform (or universal) resource locator (URL) that points to data collector source 137. Data collector source 137 may be any other code that is executable by a web browser, e.g., a JavaScript.

Analysis Server 130 may be a server computer or a group of server computers connected to network 140. Analysis web server 133 may be a web server module, unit or application, e.g., an Apache HTTP Server that may be included in analysis server. Analysis web server 133 may serve, send or otherwise provide, files over the internet, e.g., webpages including client-side code such as JavaScript files. Analysis web server 133 may be capable of processing requests from client or users' browsers and may further be adapted to sending responses, for example analysis web server 133 may be capable of supporting representational state transfer (REST) web services as known in the art, (e.g., as described in https://en.wikipedia.org/wiki/Representational_state_transfer).

Data collector source 137 may be any suitable executable code. Data collector source 137 may be a file or set of files stored on analysis server 130 and/or hosted by the analysis web server, for example, files that include one or more JavaScripts. In an embodiment, when data collector source 137 is executed by a browser (e.g., browser 111), data collector source 137 executes a data collector collection function as described herein. Data collector source 137 may include data needed by executable code in data collector source 137. For example, a URL, or the internet protocol (IP) address and port of analysis serve 130 may be included in data collector source 137.

In a flow according to an embodiment of the invention, when a user requests a webpage from web server 120 (e.g., as included in webpage source 122), data collector reference 123 is loaded into the user's browser with the requested webpage. When data collector reference 123 is executed by the user's browser, it fetches data collector source 137 from analysis web server 133, loads data collector source 137 into the user's web browser and causes an execution of data collector source 137. Data collector source 137 may be executed by the user's browser and may perform a data collection function as further described herein.

Analysis Service 136 may be a unit adapted to provide web services, for example, REST web services as known in the art. Analysis service 136 may execute or perform an analyses functions as further described herein. Baseline pool 135 may be any suitable data structure maintained by analysis service 136 or analysis server 130. As described herein, baseline pool 135 may be used to evaluate and classify, describe or analyze webpages as further described herein. Classification may include, for example, assigning labels or descriptions to web pages.

Results cache 134 may be any suitable a data structure for storing results as described herein. In an embodiment, results cache 134 includes representations of webpages. Results cache 134 may store a classification of webpages as further described herein. Controlled browser unit 132 may be any web browser executed on or by analysis server 130. Generally, controlled browser 132 may be a commercial or other web browser that was tested or checked to verify that it includes no malicious or unknown code. For example, an engineer or expert may verify that an installation of a commercial web browser is a clean, fresh installation, e.g., controlled browser 132 is code as provided by a provider of the web browser. For example, an engineer or expert may verify that controlled browser 132 does not include unknown plugins (or plugins), add-ons, toolbars and the like.

Figure 1B:
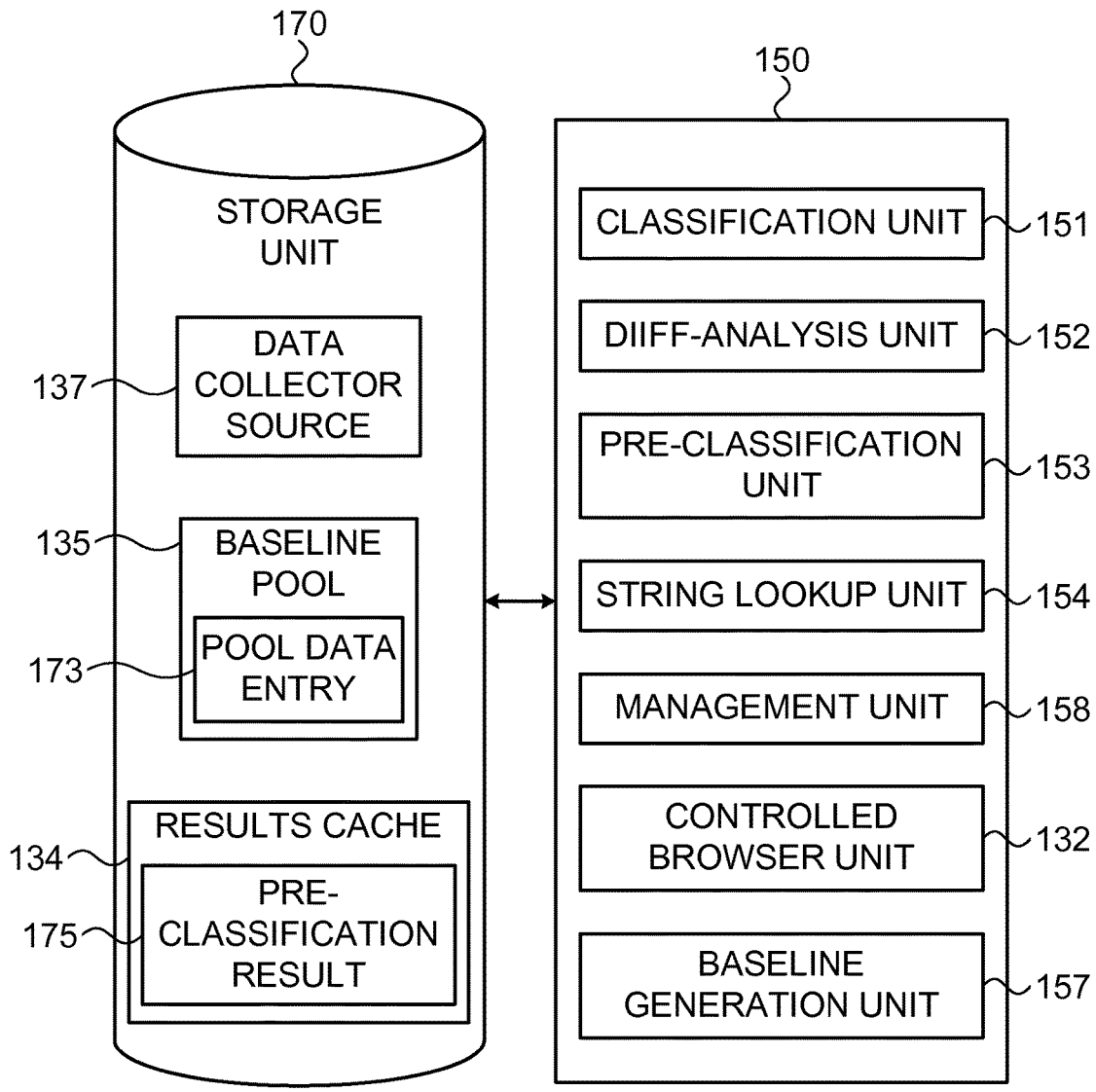
FIG. 1B shows an exemplary system according to embodiments of the invention.

Reference is made to FIG. 1B which shows an exemplary system according to embodiments of the invention. It will be understood that various systems may be designed and/or deployed according to embodiments of the invention. For example, either one of the systems shown in FIGS. 1A and 1n FIG. 1B may be used according to embodiments of the invention. It will further be understood that units or elements shown in FIG. 1A and FIG. 1B are exemplary units or components and other components may be used. For example, two or more units shown in FIG. 1B may be combined into a single unit or a unit shown in FIG. 1B or FIG. 1A may be divided into two or more units.

As shown, a system may include a storage unit 170 and a computing system 150. Computing system 150 may be, or may include, any suitable computing device or computing sub-system. For example, computing system 150 may be configured to perform functions and operations as described with reference to analysis server 130. In an embodiment, analysis server 130 may be implemented using computing system 150 and storage 170.

Figure 14:
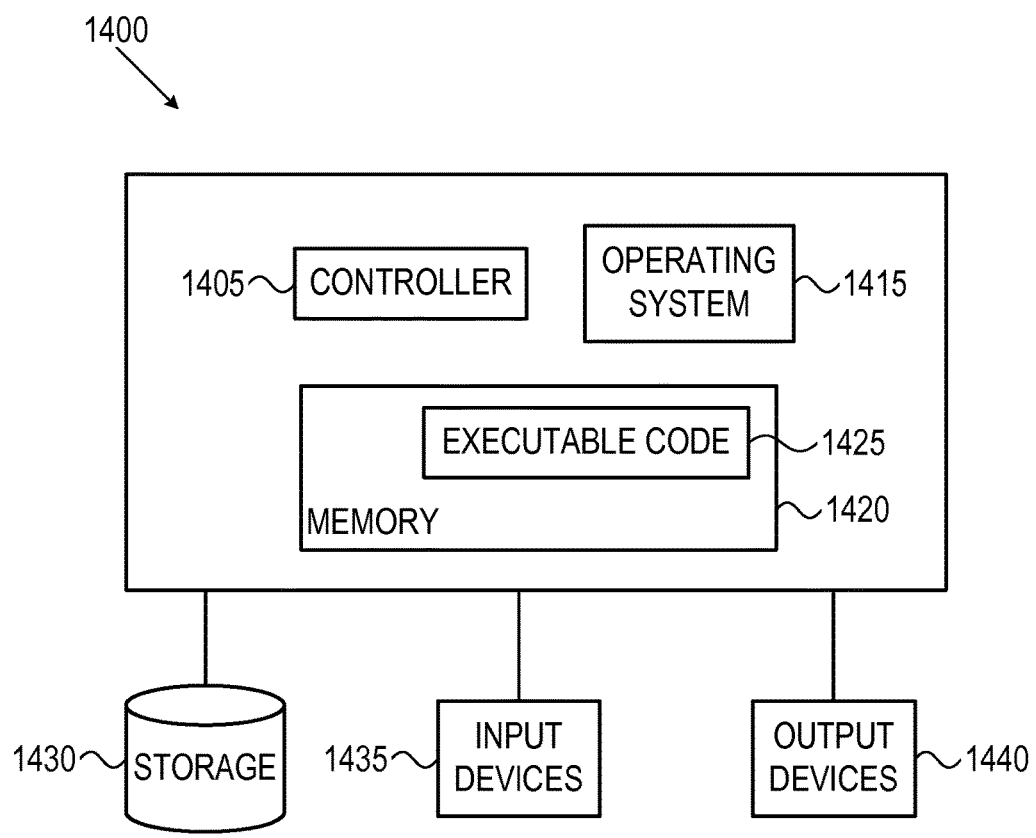
FIG. 14 shows high level block diagram of an exemplary computing device according to embodiments of the present invention.

Computing system 150 may include a non-transitory memory and a controller and modules or units shown included in computing system 150 may be executable code segments that, when executed by the controller, causes the controller to perform functions or operations of these modules or units. For example, computing system 150 may include one or more computing devices as shown in FIG. 14 and described herein and modules or units shown included in computing system 150 may be executable code segments similar to executable code 1425 as shown in FIG. 14.

As shown, a system may include a classification unit 151, a diff-analysis unit 152, a pre-classification unit 153, a string lookup unit 154, a controlled browser unit 132, a baseline generator unit 157 and a management unit 158. Classification unit 151, diff-analysis unit 152, pre-classification unit 153, string lookup unit 154, controlled browser unit 132, baseline generator unit 157 and management unit 158 may be any suitable units, modules or components. For example, these units may be applications, programs or other executable code segments that may be executed by a controller. For example, classification unit 151, diff-analysis unit 152, pre-classification unit 153, string lookup unit 154, controlled browser unit 132, baseline generator unit 157 and management unit 158 may be executable code segments similar to executable code 1425 as shown in FIG. 14.

As further shown, storage unit 170 may store or include a data collector source 137. As shown, storage unit 170 may store or include a baseline pool object or data structure 135. As shown, baseline pool 135 may include a pool data entry, field, object or structure 173. For the sake of clarity and simplicity only one pool data entry 173 is shown in baseline pool 135, however, it will be understood that a plurality of pool data objects similar to pool data entry 173 may be (and typically are) included in baseline pool 135.

As shown, storage unit 170 may store or include a results cache object or data structure 134. As shown, results cache 134 may include a pre-classification entry, object or structure 175. As indicated by the double-headed arrow connecting storage system 170 and computing system 150, data included in storage system 170 may be accessed and/or manipulated by modules included in computing system 150, e.g., as described herein.

It will be understood that components and/or elements included in computing system 150 and storage 170 as shown in FIG. 1B are exemplary elements and components and other configurations, systems or components may be used without departing from the scope of the invention. For example, classification unit 151, diff-analysis unit 152, pre-classification unit 153, string lookup unit 154, controlled browser unit 132, baseline generator unit 157 and management unit 158 may be software modules or units that may be combined into a single module or unit or other number of units. In some embodiments, some of classification unit 151, diff-analysis unit 152, pre-classification unit 153, string lookup unit 154, controlled browser unit 132, baseline generator unit 157 and management unit 158 may be distributed over, and executed by, a number of computing devices or they may be executed by, or on, a single computing device. For example, classification unit 151, diff-analysis unit 152, pre-classification unit 153, string lookup unit 154, controlled browser unit 132, baseline generator unit 157 and management unit 158 may be executable code segments similar to executable code 1425 that may be loaded into one or more memories similar to memory 1420 and executed by one or more controllers that are similar to controller 1405.

Figure 1C:
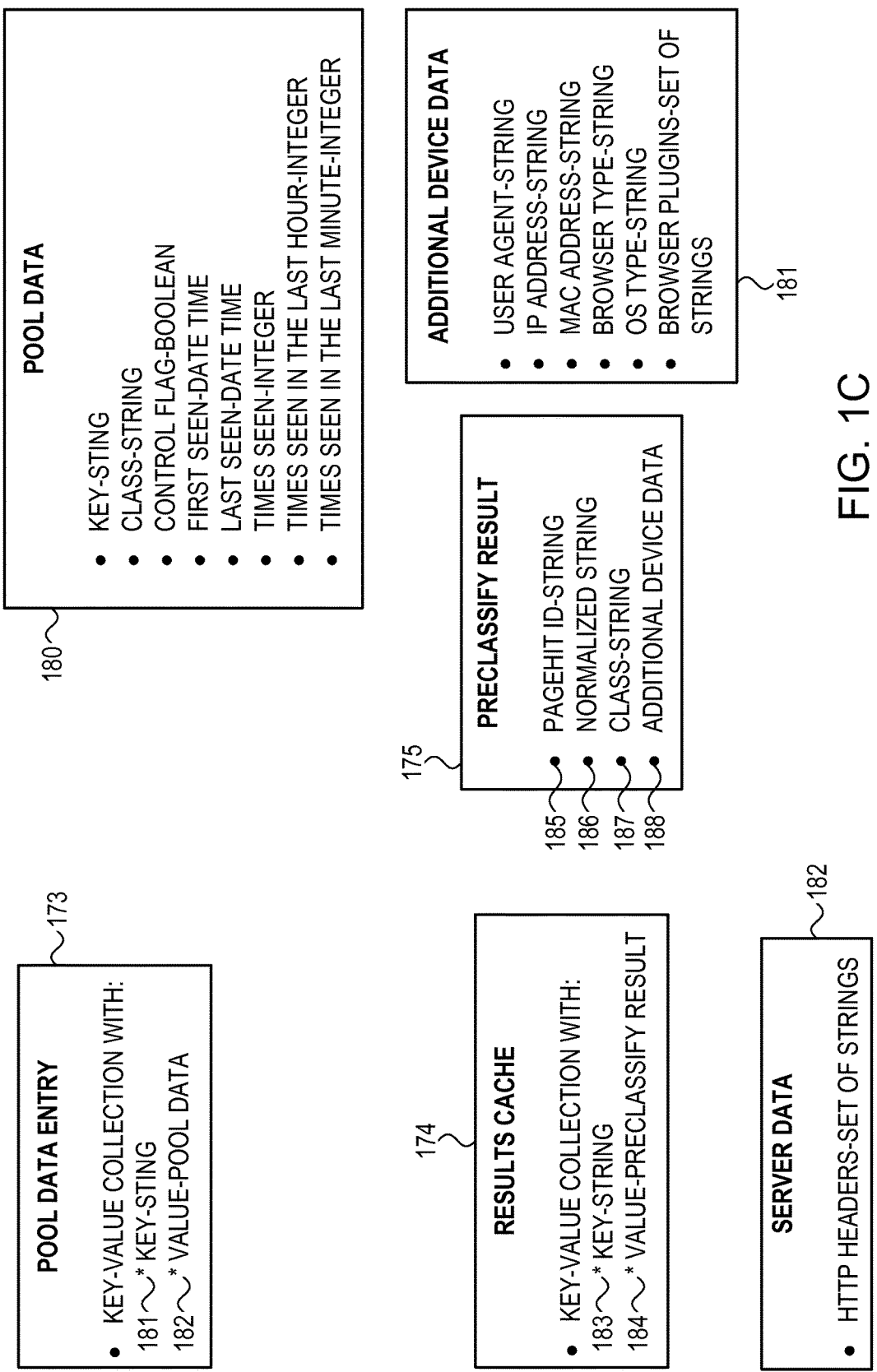
FIG. 1C shows data structures maintained by embodiments of the present invention.

Reference is made to FIG. 1C, which shows exemplary data structures that may be maintained and used by embodiments of the present invention. As shown, pool data entry 173 may include a key-value structure that may include a key 181 (e.g., usable for search operations as known in the art) and a pool data table 182 that may be any suitable list, table or any other suitable structure. As shown by pool data 180, a pool data structure may include a key field or entry that may be a text string, a class field or entry that may be a text string. A text string as referred to herein may be a sequence of characters as known in the art. For example, in an embodiment, a text string is a sequence of American Standard Code for Information Interchange (ASCII) digital codes as known in the art. As shown, pool data 180 may include a control flag field or entry that may be a boolean variable and a first seen field or entry that may indicate or reflect the date and/or time a webpage associated with data pool entry 173 was first seen or processed by computing system 150. For example, a first seen field may be an integer as known in the art. In an embodiment, a classification is a string (as shown included in pool data 180). For example, in an embodiment, a classification is set by storing a string in the pool data 180 (e.g., in the class field or entry as shown). A classification may be determined by examining a class field pool data 180. Accordingly, a classification of a web page may be the class shown in pool data 180, setting a classification may be done by setting the value of the class field or entry in pool data 180 and determining a classification may be done by reading the value of the class field in pool data 180.

As further shown by pool data 180, a pool data structure may include a last seen field or entry that may indicate or reflect the date and/or time a webpage associated with data pool entry 173 was last seen or processed by computing system 150. As further shown, similar entries or fields in pool data 180 may store, reflect or indicate the number of times a webpage was seen or processed, the number of times a webpage was seen or processed in the last hour and/or last minute. It will be understood that pool data 180 as shown in FIG. 1C is an exemplary structure and that other fields may be included therein.

As shown results cache 134 may include a key-value structure that may include a key 183 (e.g., usable for search operations as known in the art) and a value 184 that may be any suitable list, table or any other suitable structure, e.g., value 184 may be a pre-classification result object 175. It will be understood that results cache 134 may (and typically does) include a plurality of key-value structures (e.g., a plurality of pre-classification results 175) representing a plurality of webpages processed by or known to computing system 150.

As shown, pre-classification result 175 may include a pagehit identification (referred to herein as "pagehit ID") 185 that may be any suitable variable, a normalized string 186, a class variable that may be a string and additional device data 188 that may be any suitable data, e.g., text stings, integers or other variables.

As shown by block 181, additional device data may include any data or parameter related to a device associated with a webpage. For example, pre-classification result entry 175 may be generated for a webpage processed by computing system 150 and additional device data 188 in pre-classification result entry 175 may include strings (or other suitable data objects) that record or indicate information related to the user who downloaded the webpage and/or the computing device used by the user to download or view the webpage. For example and as shown, data or parameters related to a user agent, the IP and media access control (MAC) addresses of a user's computing device, the web browser the operating system and browser plugins may all be included or recorded in the additional device data as shown.

Figure 2:
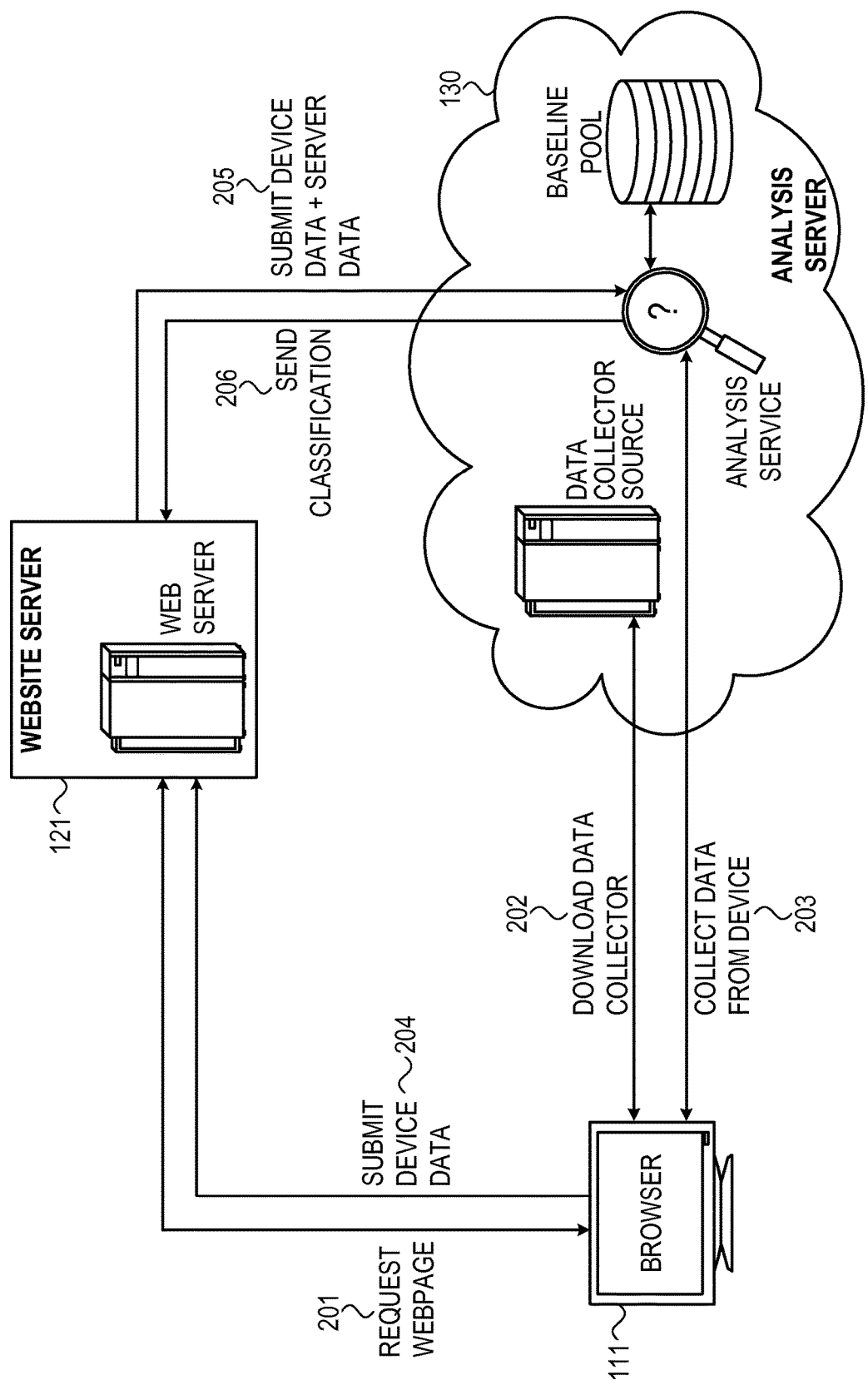
FIG. 2 shows a system and flows according to embodiments of the present invention.

Reference is made to FIG. 2, which shows a system and flows according to embodiments of the present invention. As shown by the double-headed arrow 201, browser 111 may contact website web server 121 and may request a webpage, e.g., using a URL as known in the art. As shown by the double-headed arrow 201, in an embodiment, website web server 121 responds with webpage source 122, which includes data collector reference 123. Web browser 111 may render the webpage and may execute data collector reference 123. As shown by the double-headed arrow 202, executing data collector reference 123 may cause web browser 111 to contact analysis server 130 and request data collector source 137.

For example, data collector reference 123 may include a reference to data collector source 137 (e.g., in the form of a URL or an IP address and port) and executable code that uses the reference in order to download data collector source 137 from analysis server 130. Accordingly, data collector source 137 may be obtained by web browser 111 and may further be executed by web browser 111. In an embodiment, when executed by web browser 111, data collector source 137 collects data from webpage source as provided to and/or rendered or presented by web browser 111. Data collector source 137 may process data collected by data collector source 137 and/or other data.

Any data collected and/or generated by data collector source 137 may be stored locally (e.g., on desktop 110 or in a memory associated with web browser 111) and/or sent to analysis server 130 as shown by arrow 202. As shown by arrow 204, web browser 111 may contact web server 121 and may submit or transmit collected and/or produced data thereto. For example, data collector source 137 may be configured to collect data from a webpage as described and further to provide or submit collected data to web server 121. As discussed, data collector source 137 may be configured to produce data, e.g., a text string representation of a webpage obtained and/or rendered by web browser 111. Any data collected or produced by data collector source 137 may be stored locally on desktop 110 or in browser 111 and/or provided to web server 121 or analysis server 130 as required.

As shown by arrow 205, web server 121 may contact analysis server 130 and may send, provide or submit data received from browser 111 as well as additional server data. Accordingly, analysis server 130 may be provided with data related to a webpage as rendered or presented by web browser 111. Since an injection of elements into a webpage sent from web server 121 to browser 111 may occur at, in or on browser 111 or desktop 110, data submitted to analysis server as shown by arrow 205 may be used in order to detect such injections, e.g., by comparing or otherwise relating webpage source 122 to a webpage as rendered or presented by browser 111. In an embodiment, relating a first web page to a second web page (e.g., relating webpage source 122 to a webpage as rendered by browser 111) comprises comparing the web pages. In another embodiment, relating a first web page to a second web may include comparing metadata, (e.g., date and time data, size or length, web site of origin or source, popularity and the like). Accordingly, it will be understood that relating or comparing web pages as referred to herein may include examining and comparing any data related to the web pages.

As referred to herein, webpages or web pages may be any suitable data object representing or including code to produce a web page. For example, in an embodiment, relating or comparing web pages includes relating or comparing instances or copies of data representing the web pages. For example, in an embodiment, comparing web pages includes comparing HTML code representing the web pages. Comparing or relating web pages may include comparing or relating any representations of the web pages, including comparing or relating string representations of the web pages.

An injection of elements into a webpage sent from web server 121 to browser 111 or any other modification of the webpage may occur en-route, e.g., by a component through which the webpage is transmitted from web server 121 to browser 111. Data submitted to analysis server 130 as shown by arrow 205 may be used in order to detect such injections or modifications as well.

As shown by arrow 206, having evaluated the webpage as presented to a user (based on data provided as shown by arrow 205), analysis server 130 may respond with a classification result related to the webpage (e.g., related to webpage source 122). For example, if content is added to webpage source 122 before it is presented to a user on browser 111 (e.g., by a malicious plug-in in web browser 111) then, after a user requests webpage source 122, the webpage actually presented to the user is different from webpage source 122, such difference may be detected by a system and flow as shown in FIG. 2 and further discussed herein.

Figure 3:
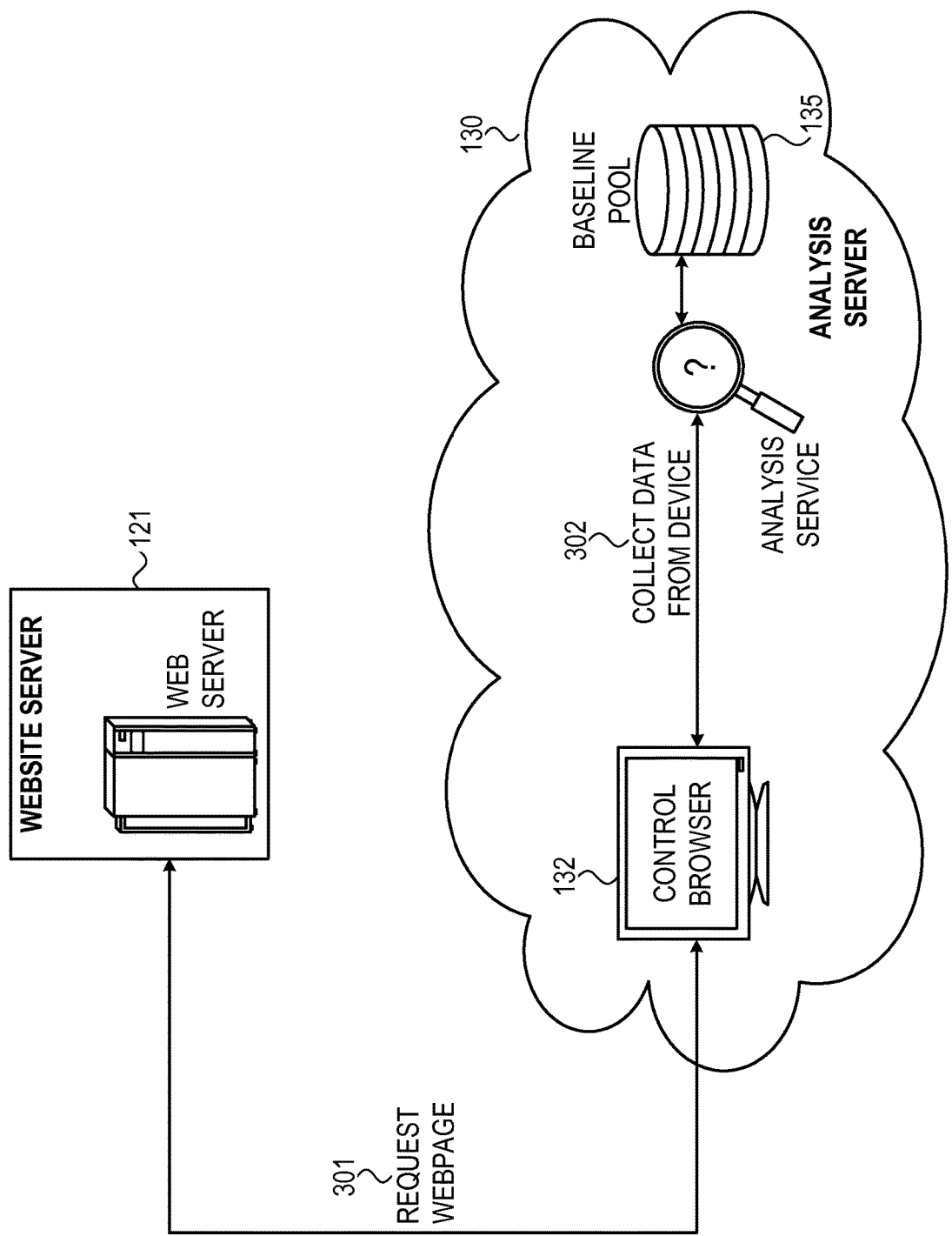
FIG. 3 shows a system and flows according to embodiments of the present invention.

In an embodiment, after producing a classification of a webpage as presented to a user, analysis server 130 sends a message to the web server that served the webpage to the user. In an embodiment, a message sent from analysis server 130 to a web server includes a classification of a webpage. For example, a message sent from analysis server 130 to a web server 120 includes the class field or entry as shown by Class in pool data 180. Any other relevant data may be included in a message sent from analysis server 130 to a web server 120. Reference is made to FIG. 3, which shows a system and flows according to embodiments of the present invention. As shown by the double-headed arrow 301, controlled browser 132 (that may be executed on a computer included in analysis server 130) may contact web server 121 and request a webpage, e.g., as known in the art. As shown by arrow 301, web server 121 may return a webpage, e.g., as known in the art. As shown by the double-headed arrow 302, controlled browser 132 interacts with an analysis service (e.g., analysis service 136) included in analysis server 130.

For example, controlled browser 132 (or the computer executing controlled browser 132) may include modules or units for analyzing a webpage and producing analysis results. Analysis results produced by a controlled web browser as described herein may be assumed to represent or be otherwise related to a clean or true representation of a webpage. For example, if controlled browser 132 is known to be clean as described herein, or free from any unknown additions or modifications, and, in addition, the connection between controlled browser 132 and web server 121 is secured or trusted, then it may be assumed that a webpage obtained by controlled browser 132 as shown in FIG. 3 is substantially the same as the webpage stored on web sever 121. Accordingly, webpages obtained by controlled browser 132 as shown in FIG. 3 and as described in related text may be used in order to generate a reference or a baseline, e.g., in baseline pool 135.

Figure 4:
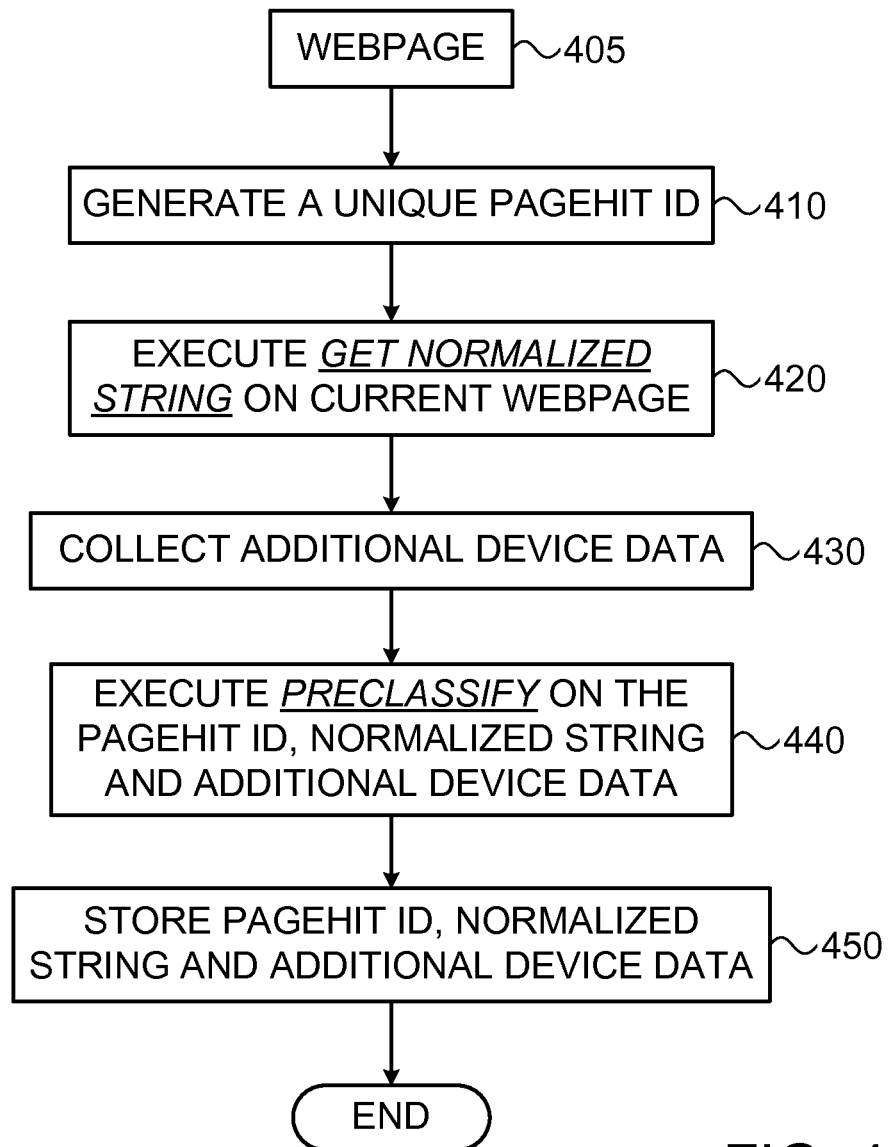
FIG. 4 is a diagram of an exemplary flow according to embodiments of the present invention.

Reference is made to FIG. 4, a diagram of an exemplary flow according to embodiments of the present invention. The method or flow shown in FIG. 4 may be used by an embodiment in order to generate a representation of a webpage. The method or flow shown in FIG. 4 may be used by an embodiment in order to generate a representation of a webpage. In an embodiment, a representation of a webpage is used to classify the webpage and/or or related webpages.

As shown by block 405, a webpage may be used as input to a method or flow. For example, a webpage obtained by a web browser may be analyzed and classified by the flow shown in FIG. 4. As shown by block 410, a unique pagehit ID may be generated. For example, some or all parameters such as an identification of a user, an identification of a computer that executes the relevant web browser, a URL used to obtain the webpage, a date and a time of day may be used in order to generate a unique identification value. Accordingly, a pagehit ID may be unique for a specific webpage obtained by a specific web browser that is executed on a specific computer at a specific time. Other parameters may be used in order to generate a unique pagehit ID. In an embodiment, when executed by, or in, a web browser, data collector source 137 generates a pagehit ID. For example, data collector source 137 may obtain an identification of a user operating desktop 110, an identification of a computer (e.g., desktop 110) that executes the web browser (e.g., the user computer that executes web browser 111), a URL used to obtain the webpage, a date and a time of day. Accordingly, data collector source 137 may use obtained data to generate a pagehit ID that may be unique for a specific webpage, received by specific user operating a specific computer at a specific time.

As shown by block 420, a normalized string representing the web page may be generated. Generating a normalized string for a web page is further discussed herein, for example, with reference to FIG. 5. In an embodiment, data collector source 137 generates a normalized string based on an HTML representation of a webpage. As shown by block 430, additional data may be collected. For example, other than data in the webpage, data related to the computing device by which the webpage was obtained (e.g., a user computer) may be collected. For example, an operating system identification, a hardware identification parameter (e.g., a media access control (MAC) address) and the like may all be collected. Data related to a computing device as described herein may be collectively referred to herein as device data.

As shown by block 440, a pagehit ID, a normalized string representing the webpage and data related to the device on which the flow or method is executed may be used as input to a pre-classification function, method or process. Pre-classification is further described herein, for example, with reference to FIG. 7. As shown by block 450, a result of a pre-classification, a pagehit ID, a normalized string and additional device data may be stored in browser memory. For example, in an embodiment, a global JavaScript variable is used as known in the art in order to store information as shown by block 450. In an embodiment, a pagehit ID, a normalized string representing a webpage and data related to a device may be sent to a server, e.g., to analysis server 130. For example, a module or unit such as a data collector 113 (that may be an executed instance of data collector source 137) described herein, executed on a user's device, generates a pagehit ID and a normalized string representing a webpage, collects data related to the device on which it is executed and further sends generated and collected data to analysis server 130. In an embodiment, possibly in addition to sending collected and generated data to analysis server 130 and/or to web server 121, data collector 113 (that may be an executed instance of data collector source 137) stores the generated or collected data, or a portion of the data on the user computer.

Figure 5:
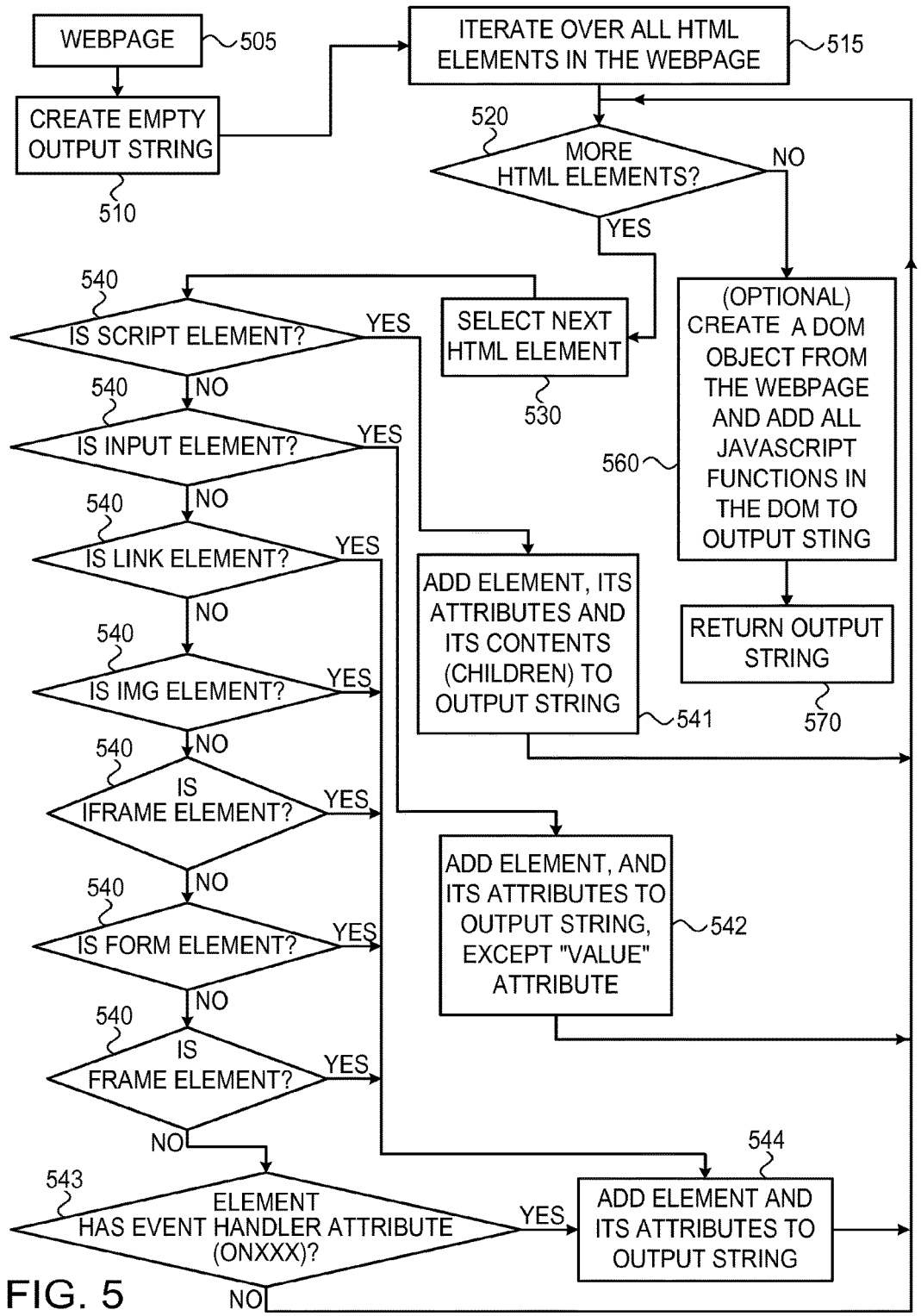
FIG. 5 is a diagram of an exemplary flow according to embodiments of the present invention.

Reference is made to FIG. 5, a diagram of an exemplary flow according to embodiments of the present invention. In an embodiment, the flow shown in FIG. 5 is performed by data collector source 137 when executed in or by a user's web browser (e.g., web browser 111). In another example, the flow shown in FIG. 5 is performed by a controlled web browser (or a module similar to data collector source 137 included in the controlled browser). For example, controlled browser 132 included in analysis server 130 may perform the flow or method shown in FIG. 5.

In an embodiment, e.g., when performed by a controlled web browser, the method shown in FIG. 5 may generate a string representation of a webpage such that an authentic or original webpage (e.g., as stored and sent by a website) is represented differently from a webpage that is the result of modifying (or tampering with) the authentic or original webpage. For example, using a first string representation as described herein produced by a controlled browser and a second string representation as described herein produced by a unit in a user's web browser, an embodiment determines whether or not a webpage as obtained by a user, or as rendered by a user's browser, is substantially the same as, or identical to, a webpage as sent by a website. Accordingly, a modification of a web page by a "man in the middle" or "man in the browser" as known in the art may be detected.

A string representation (e.g., a normalized string) may be generated such that it does not contain sensitive information such as customer data, user password, credit card number and the like. Accordingly, an embodiment may be designed such that it does not collect or send sensitive information to a server, e.g., to analysis server 130.

As shown by block 505, a webpage may be used as input to a flow, process or method. For example, an HTML string may be used to represent an input webpage. Generating an HTML string representation is a straight forward process known in the art, for example, webpages are provided to web browsers in the form of an HTML string or set of HTML elements, accordingly, an embodiment may simply obtain a webpage HTML representation as provided to a web browser. For example, data collector source 137 is designed to obtain a webpage from the web browser in which it is executed (e.g., web browser 111 or controlled browser unit 132).

As shown by block 510, an empty output string may be generated, as described, the output string may be populated or filled with data subsequently generated or collected. As shown by block 515, the flow may iterate over all elements in the input webpage. For example, if the input webpage is provided as an HTML string then iterating over elements in the webpage includes identifying HTML elements. As known in the art, a module or unit may identify HTML elements as these elements are represented according to well known rules and syntax, namely, the syntax and rules defined by the HTML standard.

As shown by block 520, if all elements in the input webpage have been examined, then the flow may create a Document Object Model (DOM) that represents the input webpage and add the DOM and any relevant data (e.g., device data as describe herein) to an output string. For example, a DOM generated as shown by block 560 may be generated by a JavaScript code running in a web browser. As shown by block 570, the flow may return an output string.

A method of creating a string representation may include iterating over all elements in an input HTML representation of a webpage. As shown by block 530 a next element may be selected for inspection. As shown by blocks 540, the type or other attributes of a selected element may be determined. For example and as shown, it may be determined if the selected element is one of: a script, an input field or element, a link (e.g., a URL), an image (shown as "IMG"), an inline element (e.g., an element generated according to the iframe format as known in the art, e.g., as described in http://www.3schools.com/tags/tag_iframe.asp), a form element or a frame element or other element. It will be understood that the HTML elements as shown by 540 are exemplary elements and that any relevant HTML or other elements in a webpage may be identified. Generally, a module or unit (e.g., an instance of data collector source 137) may be configured to identify known HTML elements by providing HTML definitions of known elements to the module such that the module may readily identify HTML elements.

The method may include selectively including or representing selected portions or elements of the input webpage in an output string. For example, and as shown by block 541, if the currently inspected element is a script then the flow may include adding the element to the output string. Any data, parameters or information related to the script may be added to the output string. For example, if the script references a file, link or parameter then the name of the file, the link or the parameter (including the value of the parameter) may be added to the output string.

As shown by block 542, if the element is an HTML input element (e.g., an element enabling a user to enter a name, password or other input) then the flow may include representing the element in the output string, e.g., by adding at least a portion of the element to the output string. However, as shown, an embodiment may omit a value (e.g., a value entered by a user) from the output string. Accordingly, an input field or element may be recorded in the output string but the actual data or information in the input field may be omitted from the output string. Accordingly, user privacy may be observed and maintained.

As shown by block 544, elements and their attributes may be added to an output string. Accordingly, an output string generated as described herein may represent a webpage and may be used as further described herein. As described, a representation of an input webpage may be based on selected portions of the input webpage. In particular, event handlers included in a webpage may be identified and may be represented in an output string. As known in the art, HTML enables events to trigger actions. Code that performs an action based on an event is known in the art as an event handler as it handles an event by performing an action. For example, a JavaScript may be activated when a user clicks on an element in a webpage. Since a JavaScript (or any other executable code) in a webpage may perform actions that may constitute a security risk (e.g., if the event handler is injected into the webpage), an embodiment identifies event handlers and represents identified event handlers in an output string as described.

Figures 6C, 7:
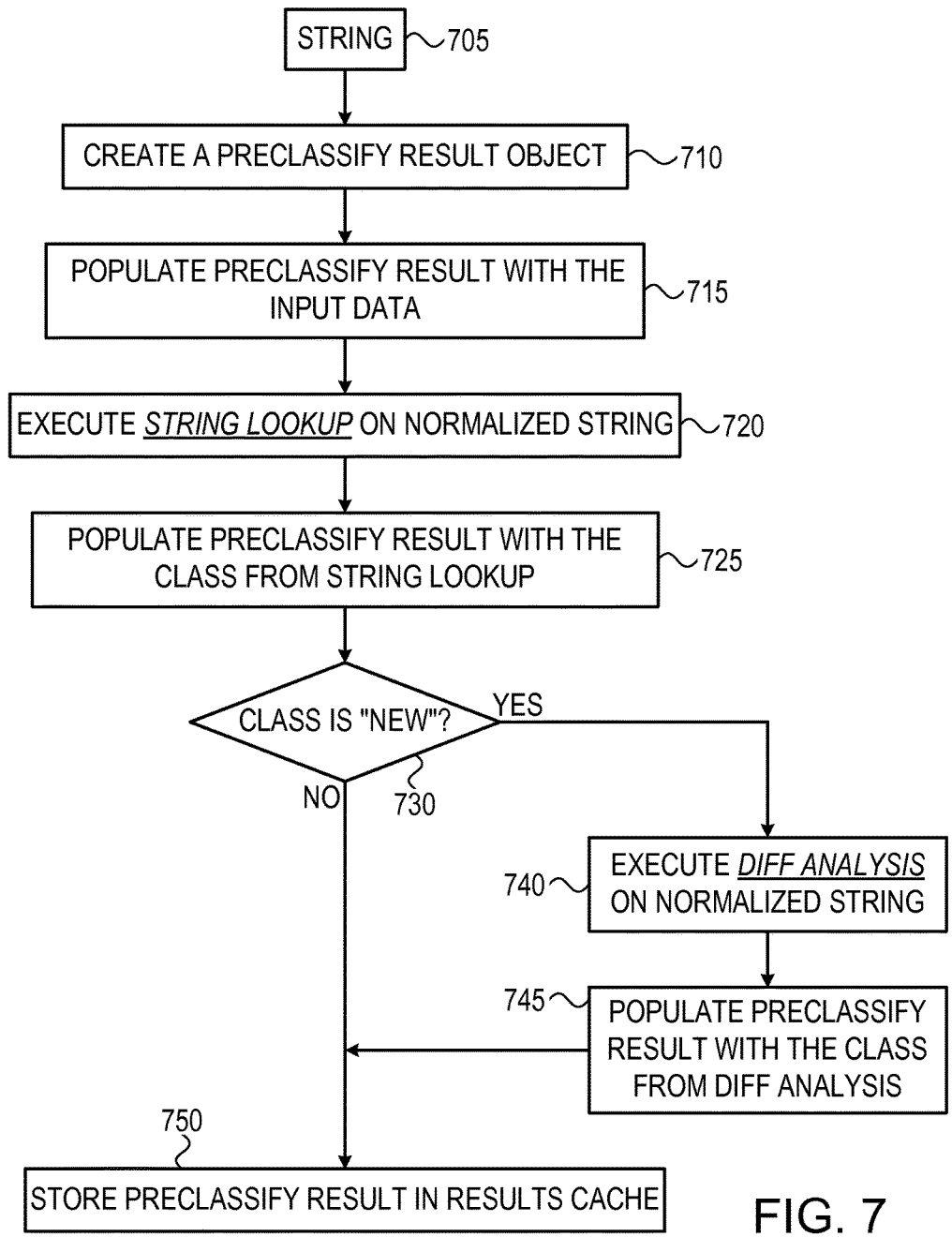
FIG. 6C shows output of processing a web page according to embodiments of the present invention.
FIG. 7 is a diagram of an exemplary flow according to embodiments of the present invention.

Reference is now made to FIGS. 6A, 6B and 6C. FIGS. 6A, 6B and 6C are provided in order to further describe generating a normalized string representation of a webpage according to embodiment of the invention. Code segment 605 in FIG. 6A shows an HTML representation of a webpage according to embodiments of the present invention, for example, an HTML representation of input webpage 505 may be similar to HTML code segment 605 in FIG. 6A. FIG. 6B shows an evolution of an output string that is generated, and returned as output, e.g., by the flow shown in FIG. 5. FIG. 6B is provided in order to enable tracking of processing of a webpage and generating an output string according to embodiments of the present invention. In particular, FIG. 6B shows how an output string that represents a web page may evolve based on processing a webpage as shown by HTML code 605 in FIG. 6A. FIG. 6C shows output of processing a webpage according to embodiments of the present invention. Block 670 in FIG. 6C shows an exemplary representation of a web page. For example, Block 670 may be an output normalized string representing a web page, generated based on processing a webpage as shown by FIG. 6A by an embodiment of the invention. Accordingly, a representation of a webpage as referred to herein may be a any suitable data structure that summarizes or captures certain aspects of a webpage, such as a normalized string or other string which includes representations of values of elements in a webpage. For example, HTML elements as known in the art are represented by a normalized string described herein.

In generating an output string that represents a webpage, an embodiment may skip or ignore some elements in the input webpage. For example, as shown by lines 610 in FIG. 6B, the <html>, <head> and <title> elements in HTML code segment 605 are skipped. According to an embodiment, predefined elements may be skipped and accordingly not represented in an output string. For example, it may be redundant to represent elements such as the <html>, <head> and <title> elements as they typically will appear in both an authentic webpage as well as in a maliciously modified webpage.

As shown by line, entry or row 620, the script element in the input webpage (as shown in FIG. 6A) is represented in the output string, e.g., by inserting the text starting with <script> and ending with </script> into the output string. As known in the art, an element in an HTML document starts with a label as in <label> and ends with the label preceded by a back slash, e.g., as in </label>. Accordingly, an embodiment identifies an opening or starting label of an element and a closing or ending label of the element thus identifying the element and includes or represents the identified element in an output string. For example, to include the element starting with the label <script> in HTML code 605 and ending with the closing label </script> in HTML code 605, a unit or module identifies the starting and ending labels and includes text between these two labels (and the labels themselves) in the output string as shown by line 620.

As shown by row 630, additional elements may be skipped (e.g., not included in the output string) and as shown by rows 640 and 650, additional elements in HTML code 605 may be added to, or represented in, an output normalized string. As shown by output normalized string 670 in FIG. 6C representing a web page, an output normalized string may include elements in the input HTML code which were not skipped or ignored when processing a webpage (or a representative HTML code segment) as described herein, e.g., with reference to FIGS. 5, 6A and 6B. As discussed, other data may be included in an output string. For example, JavaScripts included in a webpage may be included in, or appended to, an output normalized string. For example, the JavaScript "something.js" or functions in this JavaScript may be included in the output string. An output string produced as described with reference to FIGS. 6A and 6B and shown by block 670 may be referred to herein as a normalized string. For example, in an embodiment, a normalized string representing a web page is produced by selectively including strings in an input webpage in the normalized string, e.g., as shown in FIGS. 6A, 6B and 6C and described herein.

Reference is made to FIG. 7, a diagram of an exemplary flow according to embodiments of the present invention. Generally, the flow shown in FIG. 7 may be used in order to pre-classify a webpage. An initial analysis and pre-classification of a webpage may be performed and a result of the analysis and/or pre-classification may be stored and may subsequently be used in order to classify related webpages. The flow shown in FIG. 7 may be performed at, or by, for example, analysis server 130 or by computing system 150. In an embodiment, pre-classification unit 153 in computing system 150 performs a pre-classification of a webpage as described herein. In an embodiment, pre-classification unit 153 performs a pre-classification of an input webpage and, based on the pre-classification, generates and stores a pre-classification object, e.g., as shown by pre-classification result 175.

As shown by string 705, a normalized string may be used or provided as input to the flow. For example, a normalized string generated as described herein and shown in block 670 in FIG. 6C is provided as input to pre-classification unit 153. As shown by block 710, a pre-classification result object may be generated. A pre-classification result object generated as shown by block 710 may include place holders for elements such as a pagehit ID, a normalized string, a classification and additional data as described herein.

As shown by block 715, the pre-classification result object may be populated with data based on the input normalized string 705 and other data. Accordingly, the pagehit ID, the normalized string, classification and additional data may be included in a pre-classification result object. For example, as described, a module in a browser may generate a pagehit ID and a normalized string, collect additional device data and provide the generated and collected data as input to pre-classification unit 153 that performs the embodiment of the method shown in FIG. 7 and described herein.

As shown by block 720, a string lookup process may be performed on the input string 705. For example, in an embodiment, a string lookup function is performed or executed by string lookup unit 154. A string lookup operation or function as referred to herein may include identifying or detecting strings or sub-strings in an input normalized string based on known, predefined or previously seen normalized strings. According to embodiments of the invention, a string lookup process, method or function related to an input string may produce, generate or return a classification or pre-classification. For example, by performing a string lookup operation on input string 705 and additional data (e.g., a pagehit ID), pre-classification unit 153 produces a classification of an associated webpage. A string lookup process, method or function is further described herein, e.g., with reference to FIG. 8.

As shown by block 725, a pre-classification result object may be populated with a classification produced by a string lookup process. For example, the pre-classification result object generated as shown by block 710 and populated with, or otherwise made to include, data such as a pagehit ID and a normalized string as described may be updated or modified to include a classification parameter, normalized string or value. As described, a string lookup function or process may search for known strings in an input (possibly normalized) string. For example, the search may determine whether or not strings that were previously seen appear in the input string. For example, a string lookup operation may determine that a string in an input string is identical to a string already seen in other webpages. If all strings in an input string are included in a known string, then the classification entered into the pre-classification result object as shown in block 725 may be the classification of the known string. However, if no match is found, that is, if a string in the input string is unknown (e.g., does not appear in a string in baseline pool 135) then a new class may be generated for the string or the associated webpage. Accordingly, and as shown by block 730, a method may determine whether or not the input string (or associated webpage) can be classified based on known strings.

For example, based on the string lookup function shown in block 720, an embodiment may determine whether the new string is known (and accordingly, a classification for the string exists) or the string is unknown and therefore no classification for the new string does not exist. The string lookup function may indicate whether or not the input string can be classified (e.g., by entering the class name into the pre-classification result object or by entering therein a predefined value that indicates a new class is to be generated for the string). Accordingly, an embodiment may determined whether or not a string is related to a new (e.g., yet unknown) class as shown by block 730.

In an embodiment, a new class for a string (or related webpage) is generated by a diff-analysis process or function. For example, diff-analysis unit 152 may perform an analysis (also referred to herein as "diff-analysis") of differences between strings or between normalized strings.

As shown by block 740, if no class for the input string is defined or exists, a flow may include executing a diff-analysis process or function that generates a classification for a string. A diff-analysis process, method or function is further described herein, e.g., with reference to FIG. 11. Generally, a diff-analysis process may look for a previously seen string that is similar but not necessarily identical to the input string. A diff-analysis process or method may analyze the differences between an input string and a similar or reference string and may further classify the input string based on the differences. For example, a reference or similar string may be stored in a pool of known or previously seen strings (e.g., in baseline pool 135) and an input string may be an HTML representation of a webpage as described herein (e.g., a normalized string as described herein). Accordingly, if input string 705 (that may be a representation of a webpage) is not yet known by a system according to embodiments of the invention, the system may classify the input string based on known or previously seen strings (or webpages). As shown by block 745, a classification generated as shown by block 740 may be included in the pre-classify object. As shown by block 750, the pre-classification object may be stored in a results cache (e.g., in results cache 134). A results cache may be any structure or object that stores webpage classifications as described herein. As shown by the arrow connecting blocks 730 and 750, if a classification for the input string was already determined, e.g., the input string is known and classified, then the pre-classification result object may be stored in a cache as described.

Figure 8:
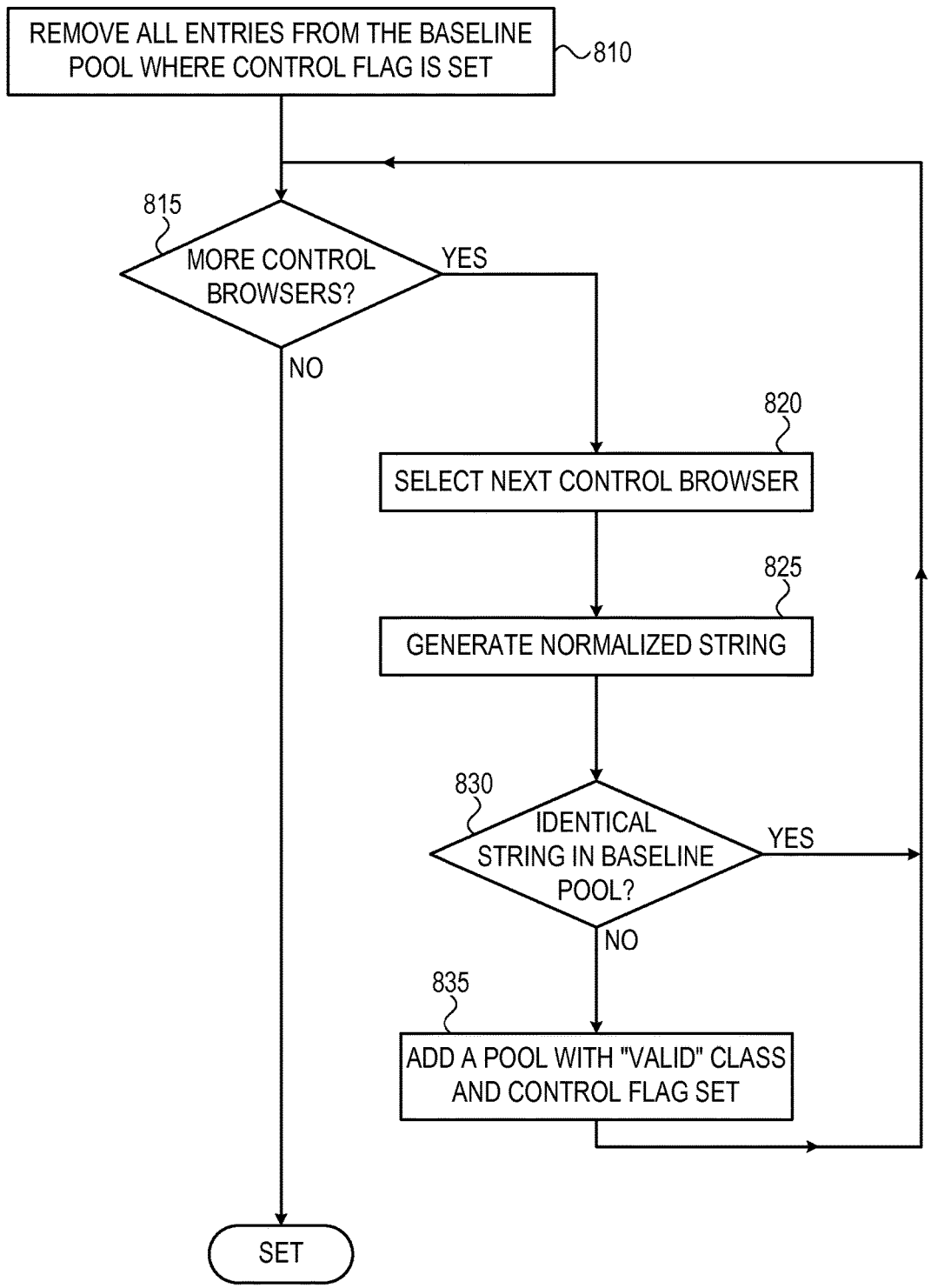
FIG. 8 is a diagram of an exemplary flow according to embodiments of the present invention.

Reference is made to FIG. 8, a diagram of an exemplary flow according to embodiments of the present invention. The flow shown in FIG. 8 may include obtaining, by a controlled browser, a webpage based on a provided URL, obtain an HTML string representation of the webpage, generate or produce a normalized string based on the HTML string and determine whether or not an entry related to the normalized string exists in a baseline pool. In an embodiment, an initial step may include removing from a baseline pool all entries that were added by, or based on input from, a controlled web browser.

The flow shown in FIG. 8 may generate a baseline pool that represents known webpages. In an embodiment, each known webpage is represented by a normalized string in the baseline pool. In an embodiment, generating a baseline pool includes removing all entries from an existing baseline pool or creating a new instance of a baseline pool, e.g., by clearing a memory segment or creating a new file or other structure that is subsequently used for storing normalized strings that represent known webpages. While in example embodiments provided herein, a string is used to represent a web page, in some embodiments, other data structures storing ordered sequences of members or data items may also be used to represent the data which, in the examples provided, is represented by strings.

As shown by block 810, the method may include checking all entries in a baseline pool and, if a control flag for an entry is set then removing the entry. An entry in a baseline pool is further described with reference to FIG. 15. Generally, an entry in a baseline pool may include a normalized string representing a webpage and additional data or metadata related to the webpage or related to the normalized string or other aspects. An entry in a baseline pool is further described with reference to FIG. 1C.

In an embodiment, metadata in a baseline pool includes a control flag that may be a boolean variable (e.g., "1" or "0") that indicates whether the entry was added by, or based on, input from a controlled browser (e.g., controlled browser 132) or otherwise, e.g., based on input received from data collector source 137 when executed on a user's browser 111. For example, the control flag for entries added to baseline pool 135 by controlled browser 132 may set to "1" and the control flag for entries added based on input from browser 111 may be set to "0". As shown by block 810, all entries in baseline pool 135 for which the control flag is set, or otherwise indicates that the entries were added by a controlled browser, may be removed. The method may iterate over a plurality of browsers. Accordingly, as shown by block 815, the method may include checking if more browsers are to be included. As known in the art, different browsers (e.g., Internet Explorer, Firefox and Chrome) may differently present the same webpage. Accordingly, an embodiment may use a plurality of different browser and generate a baseline pool based on data collected from all of the browsers.

As shown by block 820, if more browsers are to be included, the next browser may be selected. As shown by block 825, the selected browser may be caused to load the webpage for which an entry in the baseline pool is to be created and, after the webpage is loaded, a normalized string representing the webpage, as loaded by the selected browser, is generated, e.g., as described herein. As shown by block 830, the baseline pool may be checked to see if a string that matches the normalized string generated as shown by block 825 exists in the baseline pool. As shown by the arrow connecting blocks 830 and 815, if a matching string is included in the baseline pool then the method or flow may return to block 815.

As shown by block 835, if no matching or identical string is found in the baseline pool then the flow may include adding an entry to the baseline pool, setting the class for the added entry to "VALID" and setting the control flag in the entry to indicate that the entry was added by a controlled browser.

Figure 9:
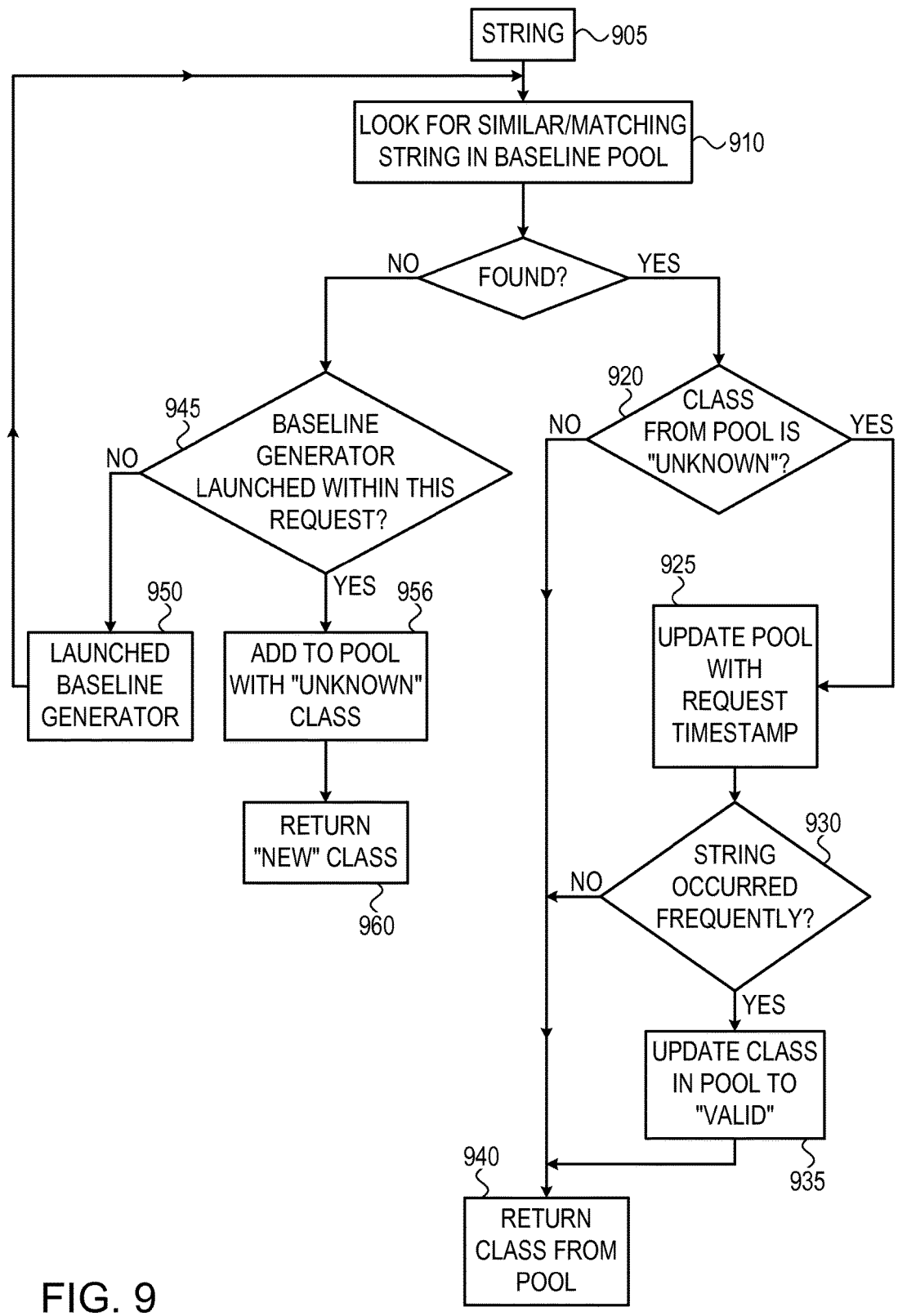
FIG. 9 is a diagram of an exemplary flow according to embodiments of the present invention.

Reference is made to FIG. 9, a diagram of an exemplary flow according to embodiments of the present invention. The method shown in FIG. 9 and described herein may be performed or executed on analysis server 130 or by computing system 150. For example, data collector module or unit 137 or controlled browser 132 may perform the method shown in FIG. 9 as described herein. In an embodiment, the method shown in FIG. 9 and described herein is used to perform and/or produce a partial classification of a webpage. In an embodiment, a partial classification of a webpage is based on an input representation of the webpage and based on previously seen webpages. In an embodiment, data collected and produced based on webpages seen by user browsers (e.g., user browsers such as browser 111) and control browsers (e.g., controlled browser 132) is used in order to produce a pre-classification of a webpage. As described, in an embodiment, producing a pre-classification of, or for a webpage may trigger an update of a baseline pool. For example, when a new pre-classification of a webpage is produced or generated, an update of baseline pool 135 may be automatically triggered or performed as further described herein.

As shown by block 905, a string may be provided as input. For example, in an embodiment, a normalized string representing a webpage produced as described herein is used as input to a method as shown by block 905. As shown by block 910, a baseline pool of strings may be searched for a similar, or, in some embodiments, an identical string. For example, a baseline pool may include a set, collection or repository of normalized strings that represent known or previously seen webpages. Accordingly, provided with an input string, a method may search for a similar, matching or identical string in a baseline pool.

As shown by block 920, if a matching (e.g., similar or identical) string is found in the baseline pool then the classification of the string in the pool is obtained and examined and the method may determine whether or not the classification is "UNKNOWN". It will be understood that other classifications may be used. As described herein, strings in a baseline pool may be associated with a classification parameter, value or string.

As shown by block 925, if the classification of the matching string is "UNKNOWN" (or another preconfigured classification) then the baseline pool may be updated with a time stamp that indicates the time on which the webpage was seen or processed as described herein. As shown by block 930, the method may include determining whether the input string 905 has been seen frequently over a predefined period of time. For example, metadata associated with a string (e.g., a normalized string) in baseline pool 135 may include a field or value that indicates the frequency of appearance of the string. For example, as shown by block 180 in FIG. 1C, the number of times a given string was seen (e.g., provided as input string 905) in the last hour, day or week may be recorded in metadata (or pool data) associated with the string. Accordingly, an embodiment may determine the frequency of appearance of a string.

As shown by block 935, if the string was frequently seen, the classification of the string may be set to "VALID" thus indicating the string is a legitimate string. Generally, it may be assumed that a string that appears often is legitimate. As discussed, strings represent webpages, accordingly, if a webpage appears frequently in many users' browsers over a predefined period of time, it may be assumed that the webpage is legitimate or authentic and is not a webpage that was modified by malicious software. It will be understood that other rules or criteria may be applied. As shown by block 940, the method may return a classification of the webpage represented by the input string 905. As shown, the classification may be one of "VALID" or "UNKNOWN". In other embodiments, other classifications may be used and returned by a method described herein.

As shown by block 945, if the input string 905 is not found in the baseline pool then an embodiment may determine whether or not a process of generating a baseline pool was already launched with respect to the input string. For example, it may be determined whether or not process or method of generating a baseline pool as described with reference to FIG. 8 is already in progress. For example, management unit 158 may control and synchronize operations of units in computing system 150 and accordingly may determine if baseline generation unit is currently generating a baseline pool.

As shown by block 956, if generating a baseline pool is in progress then an entry for the input string may be added to the baseline pool and the classification for the string (e.g., stored in associated metadata in the baseline pool) may be set to "UNKNOWN". As shown by block 960, the class "NEW" may be returned for the string if it is was not found in the baseline pool and further added thereto. As shown by block 950, if a new string is detected (e.g., a normalized string not included or represented in baseline pool 135 is identified) then a process of generating a baseline pool, e.g., as described with reference to FIG. 8, may be initiated. For example, management unit activates baseline generation unit 157.

Figure 10:
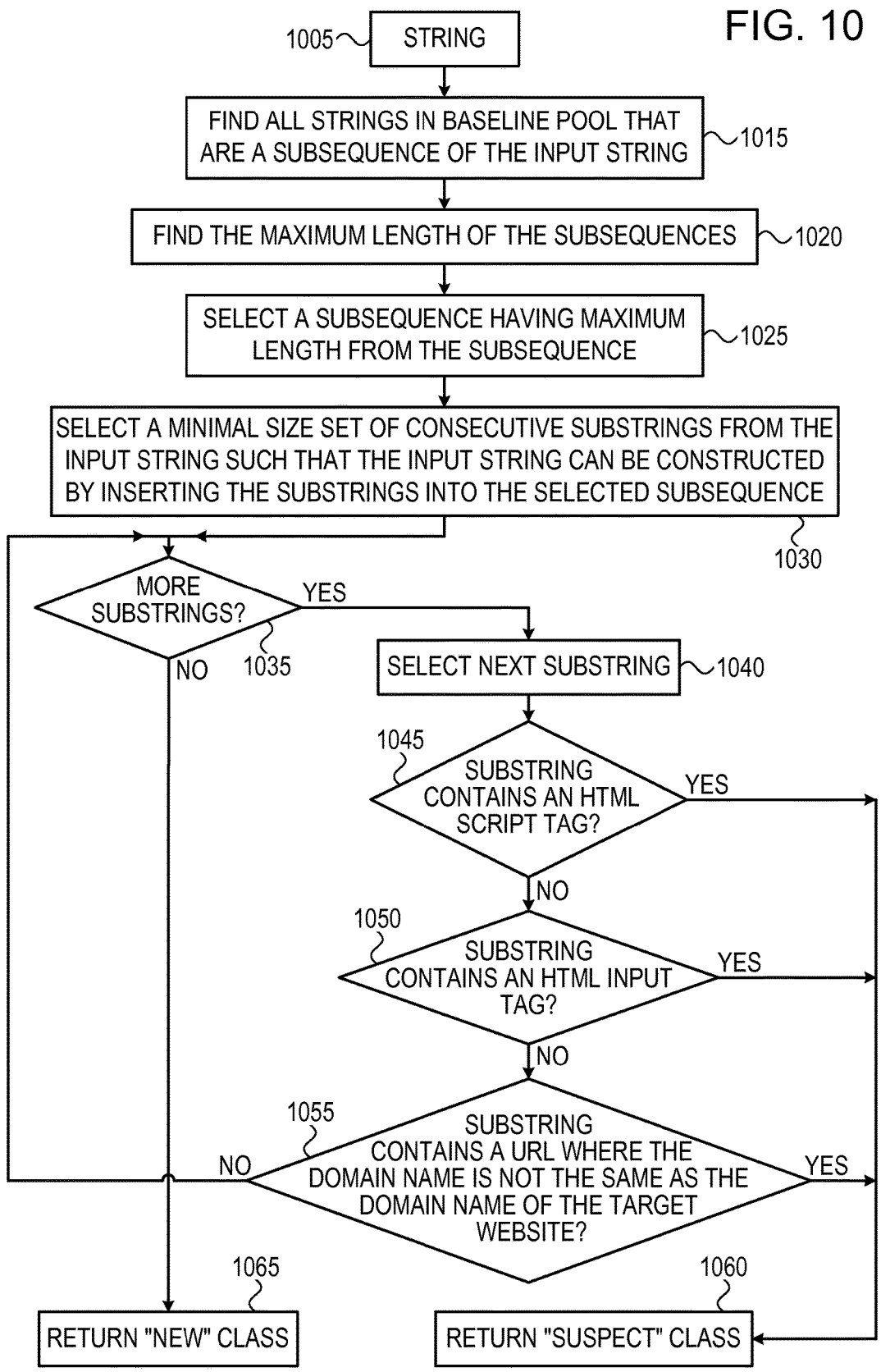
FIG. 10 is a diagram of an exemplary flow according to embodiments of the present invention.

Reference is made to FIG. 10, a diagram of an exemplary flow according to embodiments of the present invention. The method shown in FIG. 10 and described herein may be performed or executed on for example, analysis server 130 or on computing system 150. For example, in an embodiment, diff-analysis unit 152 performs a method of analyzing a difference between a normalized string produced for a webpage and normalized strings stored by a system, e.g., in baseline pool 135 or in results cache 134. In an embodiment, a classification for a string (or related webpage) is generated and/or produced by a diff-analysis process or function. For example, in an embodiment, diff-analysis unit 152 performs a diff-analysis of a difference between strings as described herein and further produces and provides a classification of a webpage.

The method shown in FIG. 10 and described herein may generally produce a partial classification of a webpage based on web pages previously seen or examined, by analysis server 130. For example, web pages previously seen or examined by analysis server may have been obtained by a controlled browser or a user browser and may have been processed by analysis server 130 as described herein. As described herein, a string lookup method, process or function may look for, and/or identify previously seen strings that are identical to a current or input string. A method as shown in FIG. 10 and described herein may look for a previously seen string that is similar but not necessarily identical to the current or input string. As described, the method may further analyze differences between an input or current string and a string included in a baseline pool. The method may further classify the input string based on a matching with a string included in the baseline pool and/or based on differences between the input string and a string included in the baseline pool.

As shown by block 1005, an input string may be provided. An input string provided as shown by blocks 1005, 905 and 705 may be referred to herein as a current string to indicate that this is the currently examined, evaluated or processed string. In an embodiment, input string 1005 is a normalized string produced as described herein. For example, in an embodiment, string lookup unit 154 produces an input string as shown by block 1005.

As shown by block 1015, the method may include finding in a baseline pool strings that are a subsequence of the input string. As referred to herein, a subsequence of a string is a sequence of text elements (e.g., a sub-string) that can be derived from the string by deleting or removing some elements from the string without changing the order of the remaining elements. As referred to herein, a first string is a subsequence of a second string if the first string can be derived or produced by deleting or removing text elements from the second string without changing the order of the text elements in the second string. For example, if the second (or input) string is "ABCDE" then subsequences (or subsequent strings) of the second string may be "ABDE", "BD", "CDE" and so on.

As shown by block 1020, the method may include finding the maximal length of a subsequence. Otherwise described, the method may identify or determine the longest subsequent string (with respect to the input string shown by block 1005) and record its length, thus the maximal length of a subsequent string is determined and recorded. For example if the input string is "ABCDE" and subsequences found in baseline pool 135 (or in results cache 134) are "ABC", "ACDE" and "BCDE", then the maximum length may be determined to be four ("4").

As shown by block 1025, the method may include selecting a subsequent string that has the maximal length. It will be noted that a number of subsequent strings (or subsequences) in baseline pool 135 may have the maximal length. For example if the subsequences are "ABC", "ACDE" and "BCDE", the selected subsequent string may be "ACDE" or "BCDE". Otherwise described, the method may select the longest subsequent string (or subsequence) or one of the longest subsequent strings.

As shown by block 1030, the method may include selecting a minimal size set of consecutive substrings from the input string such that the input string can be constructed by inserting the substrings into the selected subsequence. For example if the input string as shown by block 1005 is "ABCDE" and the subsequence found in baseline pool 135 is "AD", then the set of substrings selected may be {"BC", "E"} since by inserting into the subsequence "AD" the substring "BC" after "A" in the subsequence and further inserting the substring "E" after the "D" in the subsequence, the input string "ABCDE" can be reconstructed. As shown by block 1035, the method may iterate over all substrings in the input string identified or determined as shown by block 1030. As shown by block 1040, the next substring may be selected for processing.

In an embodiment, a classification of a webpage is generated based on analyzing substrings in a normalized string that represents the webpage. As shown by block 1040, if the substring contains an HTML script tag then the class or classification of the webpage may be set to, for example "SUSPECT", or another classification which indicates that the web page is suspected of being tampered with, or suspected of including malicious elements, e.g., an injected JavaSript. For example, if a webpage as represented by a normalized string is known (e.g., the known normalized string is included in a pool data entry 173 then the string lookup unit 154 will find an identical normalized string in baseline pool 135 and classify the webpage as known. However, if the webpage is unknown, e.g., the string lookup function as performed by the string lookup unit 154 does not find an identical string in baseline pool 135, then diff-analysis unit 152 may classify the webpage as suspicious (e.g., using a class of "SUSPICIOUS") if the webpage (e.g., as represented by a normalized string) includes an HTML script. As known, scripts may perform various actions (similar to a program or other executable code) and may therefore by unsafe or potentially harmful. Accordingly, if an unknown webpage includes a script, a method may automatically classify the webpage as suspicious as shown by block 1045.

As shown by block 1050, if the webpage includes an input field it may be classified as suspicious. For example, an input field injected into a webpage by a malicious software may include an input field designed to cause a user to provide a password or other sensitive information, accordingly, such unknown webpage may be classified as suspicious as shown by block 1050. Similarly and as shown by block 1055, if a webpage includes a URL that references a domain that is different from the domain of the webpage itself then the webpage may be classified as suspicious. For example, if the domain of the webpage is www.AAA.BBB.com and a URL included in the webpage (and therefore included in a normalized string generated for the webpage as described herein) is www.CCC.DDD.com then the webpage may be classified as suspicious. For example, a malicious software may inject the latter URL in an attempt to cause a user to navigate his or her web browser to a web site that is unrelated to an original web site.

It will be understood that conditions for classifying a webpage as suspicious as shown by blocks 1045, 1050 and 1055 are exemplary ones. It will be understood that any other conditions, rules or criteria may be enabled by an embodiment, e.g., by providing diff-analysis unit 152 or other units in computing system 150 with suitable criteria, rules or other parameters. As shown by block 1065, if the webpage is not classified as suspicious it may be classified as "NEW" thus, a webpage that is unknown by a system may be classified as "NEW" or "SUSPICIOUS". It will be understood that any other value or string indicating that a web page is (yet) unknown may be used as described herein. As further described herein, a webpage classified as "NEW" or "SUSPICIOUS" may subsequently by classified as "KNOWN" or "VALID", e.g., if the webpage appears at a predefined frequency, more than a predefined number of times or based on other criteria. The classification of a webpage generated as shown by FIG. 10 and described herein may be returned. For example, provided with a normalized string representing a webpage, diff-analysis unit 154 may return a classification of a webpage.

Reference is made to FIG. 11 which shows content of entries in a baseline pool and an input string according to embodiments of the present invention. Blocks 1105 and 1110 in FIG. 11 show exemplary keys in a baseline pool (e.g., keys of known webpages in entries in baseline pool 135 as shown by key 181 and described herein). Block 1115 in FIG. 11 shows an exemplary normalized string representing an input webpage being analyzed or processed. The keys shown by blocks 1105 and 1110 may be produced based on webpages previously seen and/or analyzed by a system as described herein.

As shown by blocks 1105 and 1110, both keys are almost identical except for the substring ?lang=es in the key shown by block 1110 and missing from the key shown by block 1105. This example represents a typical and legitimate difference in how a real-world webpage appears on different devices, in this case based on the device's preferred language.

As shown by block 1115, the input string is almost identical to the key shown by block 1105, except for the additional input field "ATMPIN". This example represents a typical malicious HTML injection wherein a malware injected the additional input field with some surrounding text (which may have been removed by the "get normalized string" function described herein). For example, the input field "ATMPIN" may be injected into a webpage in an attempt to lure the victim user to enter his or her secret ATM PIN, as part of a malicious attempt to steal the victim's credentials.

As shown, the only string in the baseline pool that is a subsequence of the input string is included in the key shown by block 1105. As shown, the key shown by block 1110 key is not a subsequence of the input string because the string "?lang=es" does not appear in the input string. Since, in this example, there is only one subsequence, the maximum length is the length of the only subsequence (the one shown by block 1105).

In the example shown in FIG. 11, the substring "<input type="text" id="ATMPIN" name="ATMPIN"></input>" satisfies the required condition, because the input string as shown by block 1115 can be constructed by inserting the substring "<input type="text" id="ATMPIN" name="ATMPIN"></input>" into the subsequence shown by block 1105. Note that the input string shown by block 1115 cannot be constructed with less than one substring, so the subsequence shown by block 1105 has the minimal size, thus satisfying the minimal size condition discussed herein. Accordingly, the operations described with reference to blocks 1012, 1020, 1025 and 1030 is exemplified herein.

In the exemplary case shown in FIG. 11, it may be found that the substring in the input string does not include an HTML SCRIPT tag but does include an HTML input tag. Accordingly, the related webpage may be classified as "suspicious" and a class "SUSPICIOUS" may be returned.

For example, in an embodiment, diff-analysis unit 152 identifies the key in baseline pool 135 from which the current input normalized string can be constructed. In an embodiment, diff-analysis unit 152 identifies, in the input normalized string, the substrings that can be inserted into the baseline key in order to construct the input normalized string. For example, in an HTML injection scenario, this corresponds to identifying the original webpage, and then identifying the injected strings. In an embodiment, once the injected strings are identified, they are analyzed individually to determine whether their purpose appears to be malicious or legitimate and the webpage corresponding to the input normalized string is classified accordingly.

Figure 12:
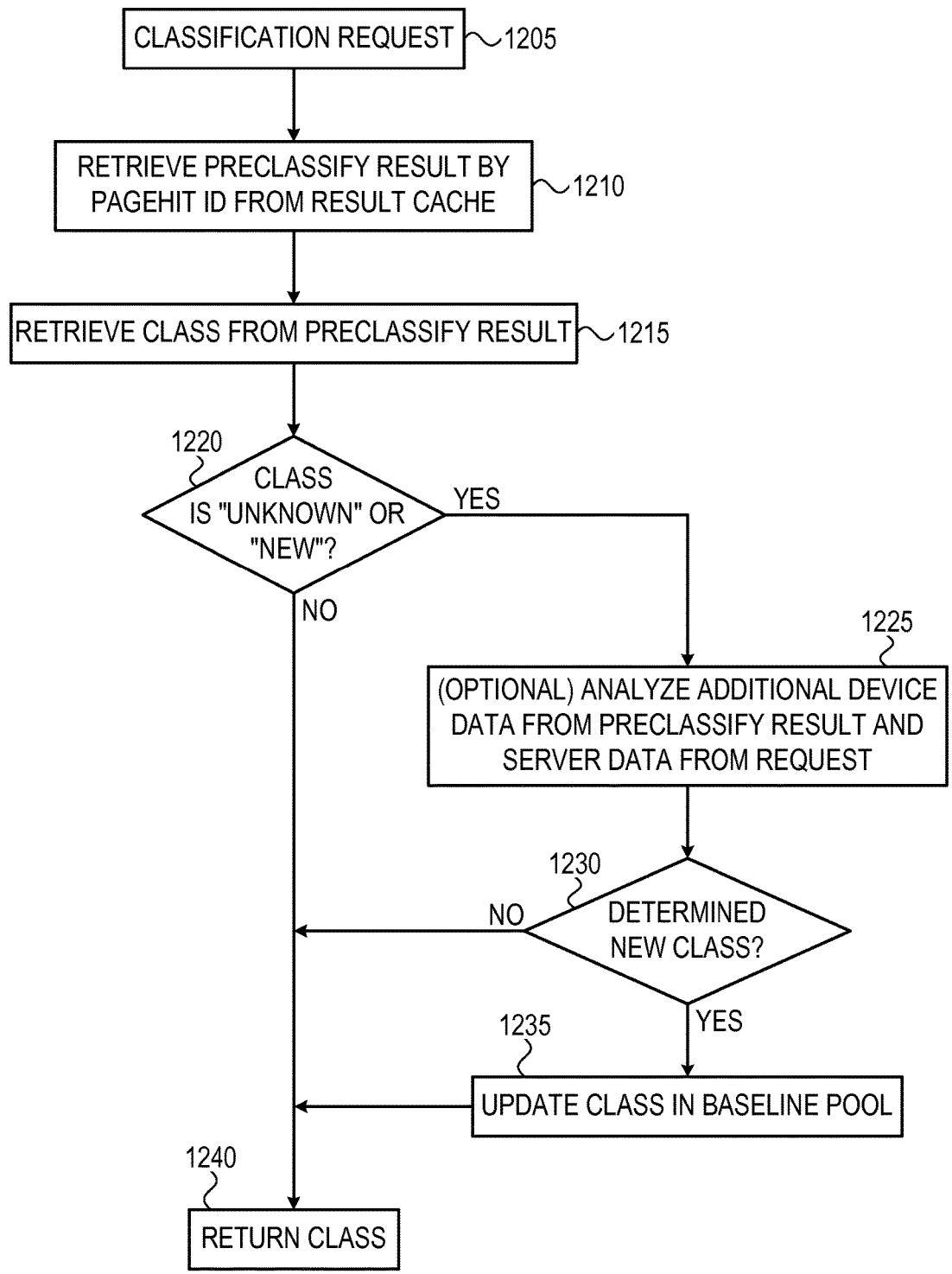
FIG. 12 is a diagram of an exemplary flow according to embodiments of the present invention.

Reference is made to FIG. 12, a diagram of an exemplary flow according to embodiments of the present invention. In an embodiment, the flow shown in FIG. 12 and described herein is performed by classification unit 151 included in analysis server 130. For example, in an embodiment, classification unit 151 receives a classification request from web server 121 and returns a classification to web server 121. For example, in an embodiment, data collector source 137, when executed on a user's computer, collects and generates data related to a webpage (e.g., generates a normalized string representing the webpage) and sends the normalized string (and possibly additional information) to web server 121. Web server may then send data received from data collector source 137 to classification unit 151 (that may be included in analysis server 130) and classification unit 151 process the information received from web server 121, determines and/or produces a classification for the webpage. Classification unit 151 or another unit in analysis server 130 (e.g., management unit 158) may send the classification of the webpage to web server 121.

As shown by block 1205, a classification request may be obtained as input. For example, a module or unit installed on web server 121 may be configured to interact with data collector source 137 (e.g., using a predefined port as known in the art). For example, a module on web server 121 may receive data produced by data collector source 137 as described herein and may send the received data, e.g., as a classification request, to classification unit 151 in analysis server 130. In an embodiment, a classification request as shown by block 1205 includes at least a pagehit ID. The classification request may include additional data, e.g., device data collected or generated by data collector source 137 when executing on a user's device and/or server data, e.g., collected by a module installed on web server 121. As shown by block 1210, the flow may include retrieving a pre-classify result (e.g., as shown by block 175 in FIG. 1B) from a results cache, e.g., from results cache 134. For example, using a pagehit ID as a key, classification unit 151 searches results cache 134 and retrieves a pre-classification result that matches the pagehit ID.

As shown by block 1215, a classification may be obtained or extracted from a pre-classification object. As discussed herein and shown by class 187 in FIG. 1C, a pre-classification result object may include a classification. In an embodiment, a pre-classification is a specific text string or specific value stored in pre-classify object 175. The value of a pre-classification may be set as described and/or may be examined in order to determine a pre-classification. Accordingly, a classification may be obtained using a pagehit ID by finding a pre-classification object using the pagehit ID and further extracting the class from the pre-classification object. As shown by block 1220, the flow may include determining (e.g., by classification unit 151) if the class in the pre-classification object is "NEW" or "UNKNOWN". It will be understood that any class may be defined in a system or method and the class of a pre-classification object (e.g., class 187 as shown in FIG. 1C) may be set to any value. As shown by 1225, if the class in the pre-classification object is either "UNKNOWN" or "NEW", the flow may include analyzing additional data, e.g., device data stored in a pre-classification object or server data provided from the relevant web server as described herein.

As shown by block 1230, the flow may include determining whether or not the class is a new class. As shown, if it is determined the class is not new then the class, as retrieved pre-classification object, may be returned. For example, classification unit 151 extracts the class included in pre-classification object 175 and sends it to web server 121. As further shown by the arrow connecting blocks 1220 and 1240, if the class included in a pre-classification object is neither "NEW" nor "UNKNOWN" then the class as indicated in the pre-classification object (e.g., in pre-classification object 175) may be returned as output and/or sent to the web server. For example, in an embodiment, classification unit 151 extracts the class from pre-classification object 175 and sends the class to web server 121.

As shown by block 1235, if it is determined that the class is not "NEW" then a baseline pool may be updated. As shown, after updating a baseline pool, the class (e.g., as updated) may be returned or provided, e.g., to a web server as described.

Reference is now made to FIG. 13 that shows content of a webpage and output of processing a web page according to embodiments of the present invention. Block 1305 shows a webpage (in HTML format) that may be downloaded by a user's web browser. Block 1310 shows a normalized string that may be produced for (or in order to represent) the webpage shown by block 1305.

A scenario according to an embodiment of the present invention, in which a webpage with HTML injection is classified may be best understood with reference to FIG. 13. A scenario according to an embodiment may begin with a user navigating to a website that is associated with a system according to an embodiment of the invention. For example, using web browser 111 a user obtains webpage (e.g., webpage source 112) from web server 121. In this example or scenario, data collector reference 123 that is included in webpage source 112 is downloaded to web browser 111 with the requested webpage. Data collector reference 123 fetches (or is used to fetch or download) data collector source 137 from analysis server 130. Data collector source 137 is executed on desktop 110 (e.g., in web browser 111). Data collector source 137 generates a pagehit ID, e.g., "100", as a unique pagehit ID.

Next, data collector source 137 generates a normalized string as shown by block 1310 to represent the webpage. Next, data collector source 137 sends or submits the normalized string, the pagehit ID ("100" in this example) and additional device data to analysis server 130. On analysis server 130, pre-classification unit 153 performs a pre-classification as described herein based on (or using) the pagehit ID, the normalized string and the device data provided by data collector source 137. Pre-classification unit 153 generates a pre-classification result and stores the pre-classification result in results cache 134 (e.g., as shown by pre-classification result 175). As described herein, the pre-classification result includes the pagehit ID (that can later be used to find the pre-classification result in results cache 134). Other fields or entries in the pre-classification result stored by pre-classification unit 153 may be as shown in blocks 174, 175 and 181 in FIG. 1C and described herein.

Next, string lookup unit 154 executes a string lookup function as described herein using the normalized string produced by data collector source 137. For example, string lookup unit 154 searches baseline pool 135 (e.g., by examining a plurality of entries similar to pool data entry 173 in baseline pool 135) for a string that is identical to the normalized string. If string lookup unit does not find an identical string in baseline pool 135 then baseline generation unit 157 is called, e.g., management unit 158 that oversees the process receives an indication from string lookup unit 154 that no string was found and calls baseline generation unit 157. For example, management unit 158 calls baseline generation unit 157 and provides baseline generation unit 157 with a reference to the pre-classification result or with the normalized string.

Baseline generation unit 157 (that may be included, or executed, in controlled browser unit 132) fetches the webpage from web server 121. For example, a list of webpages (e.g., in the form of a list of URLs) is provided to baseline generation unit 157. For example, an administrator of a website provides the list. In another embodiment, a URL is sent (e.g., by data collector source 137) from desktop 110 to baseline generation unit 157. Any other method or system for providing a list of URLs may be used in order to obtain relevant webpages or URLs.

For example, baseline generation unit 157 retrieves the webpage as shown by block 605 in FIG. 6A. As shown in FIG. 6A, the HTML representation of the webpage is similar to the HTML segment retrieved by the user's browser (as shown in block 1305) except that it does not include the ATM PIN section (which was injected into the webpage according to this exemplary scenario). For example, the "ATM PIN" portion was injected by malware on the user's browser and is therefore not present in the authentic webpage retrieved by controlled browser unit 132 and/or retrieved by baseline generation unit 157, both of which may be executed on analysis server 130 and may be guaranteed or verified to be free of unknown or malicious modules or software or otherwise infected by malware Next, baseline generation unit 157 (or controlled browser unit 132) generates a normalized string that represents the (known to be authentic and clean) webpage that was retrieved by baseline generation unit 157 or by controlled browser unit 132. For example, for the webpage as shown by as shown by block 605 in FIG. 6A, the normalized string produced is as shown by block 670 in FIG. 6C.

Next, string lookup unit 154 is provided with the normalized string (e.g., as shown by block 670 in FIG. 6C) and searches for an identical string in baseline pool 135. In this exemplary scenario, an identical string is not found (e.g., because the currently processed webpage was not yet seen by the system). Since an identical string was not found and the webpage is known to be authentic (because it was obtained from the website using a controlled unit such as controlled web browser unit 132), baseline generation unit 157 adds an object to baseline pool 135 (e.g., an entry similar to pool data entry 173) and sets the class of the newly added entry to "VALID" thus indicating this entry is related to a valid webpage.

Next, management unit 158 restarts or activates string lookup unit 154 that looks (in the now updated baseline pool 135) for a string identical to the string shown by block 1310 in FIG. 13 (the normalized string produced as described). However, since the normalized string shown by block 1310 in FIG. 13 includes the injected "ATM PIN" portion, string lookup unit 154 does not find an identical string. Accordingly, a new entry that includes the normalized string shown by block 1310 is added to baseline pool 135 and the class of the new entry is set to "UNKNOWN". For example, management unit 158 may cause string lookup unit 154 to add such new entry and set the class to "UNKNOWN". String lookup may further return a class variable set to "NEW", possibly together with the pagehit ID as included in the new entry.

Next, management unit 158 invokes or calls diff-analysis unit 152 and provides the pagehit ID or other reference to the new entry added as described. Provided with an entry in baseline pool 135 (or reference thereto) diff-analysis unit 152 analyzes the difference between the provided entry and other entries in pool data 135 as described herein. In this exemplary scenario, diff-analysis unit 152 identifies that the entry classified as "VALID" that was added as described above includes a normalized string that is a subsequence of the normalized string of the new entry. The normalized string in the identified entry is a subsequence of the normalized string of the new entry since the only difference between the two normalized strings is the "ATM PIN" portion in the new entry. Based on rules or criteria as described herein, diff-analysis unit 152 classifies the new entry as "SUSPICIOUS", e.g., by setting the class field in the entry to "SUSPICIOUS". For example, since the new entry includes an HTML input tag (as shown by the line with the "ATM PIN" in block 1310) diff-analysis unit 152 classifies the new entry as suspicious. Next, diff-analysis unit 152 stores the new entry in results cache 134. For example, diff-analysis unit 152 creates a new entry (e.g., one similar to pre-classification result 175) in results cache 134 and sets the class of the new or added entry to "SUSPICIOUS". In another embodiment, diff-analysis unit 152 is provided with a normalized string, classifies the normalized string as described herein and provides the normalized string and a class to pre-classification unit 153 that creates an entry in results cache as and sets the class of the created entry as determined and provided by diff-analysis unit 152. Accordingly, a system identifies that a webpage includes an injected (and possibly malicious) element and records data related to such infected webpage, e.g., an indication, and identification of an infected webpage is recorded in results cache 134 as described.

In an embodiment, when executed on a user's web browser, data collector source 137 generates a pagehit ID (e.g., "100" in an exemplary case) and a normalized string in association with a webpage and, in some cases, stores the pagehit ID and normalized string on the user's device. For example, data collector source 137 stores the pagehit ID and possibly the normalized string in a memory used by or dedicated to the web browser. In an embodiment, data collector source 137 sends at least the pagehit ID to the web server from which the webpage was received. As described herein, in an embodiment, data collector source 137 also sends the pagehit ID and normalized string to analysis server 130 where the webpage, as received by the user's browser, is analyzed and classified as described.

At any point, a module or unit on the web server may send at least the pagehit ID to analysis server 130 and request a classification of the webpage. In an embodiment, sending of the pagehit ID is done automatically, e.g., when a user causes web browser 111 to submit data to the web server 121, data stored in memory of web browser 111 (e.g., the pagehit ID) is automatically sent to web server 121 along with other data submitted by the user, and web server 121 sends the pagehit ID to analysis server 130. In some embodiments, the normalized string generated by data collector source 137 is also stored in browser memory and sent to the web server.

In an embodiment, when a pagehit ID is received from a web server at analysis server 130, analysis server 130 uses the pagehit ID to return a classification of the webpage. A classification of a webpage may be in association with a specific user, browser or computer. For example, as described, a pagehit ID is generated for a specific computer or user using a specific web browser at a specific time. For example, a first pagehit ID may be generated for a webpage retrieved by a first user and a second, different pagehit ID may be generated for the same webpage retrieved by a second user. Similarly, different pagehit IDs may be generated for the same webpage retrieved by the same user at different times. As known in the art, the same webpage may include different injected elements at different times, when retrieved by different users or different web browsers, generating different pagehit IDs for different circumstances as described, e.g., generating a pagehit ID based on, for example, time, user, computing device or web browser used enables embodiments of the invention of detect cybercrime, malware presence, HTML injection, SQL injection or other malicious modifications of webpages per specific time, user, browser, computing device etc.

Either sent directly by data collector source 137 to web server 121 or stored in browser memory and sent with submission of user data (e.g., when the user logs in to an application on web server 121 or submits a form), the pagehit ID is received at web server 121 and forwarded therefrom to analysis server 130 where a classification for the webpage is produced and returned to web server 121.

In an embodiment, when a pagehit ID is received from web server 121 it is provided to classification unit 151. In an embodiment, classification unit 151 uses the pagehit ID to search results cache 134 and find a matching entry, e.g., an entry that includes that pagehit ID as received from web server 121. For example, in the exemplary scenario above, the pagehit ID received from web server 121 is "100", therefore, classification unit 151 searches for an entry with a pagehit ID of "100" in results cache 134 and finds the entry created or stored in results cache 134 as described. Classification unit 151 examines the entry found and extracts the class therein and sends the class to web server 121, in the example above, the class returned to web server 121 is "SUSPICIOUS". Accordingly, in the above example, web server 121 is now aware that the webpage as received by the user was modified before (or while) being presented to the user and may handle the case appropriately, for example prevent further access by that user.

Reference is made to FIG. 14, showing high level block diagram of an exemplary computing device 1400 according to embodiments of the present invention. Computing device 1400 may include a controller 1405 that may be, for example, a central processing unit processor (CPU), a chip or any suitable computing or computational device, an operating system 1415, a memory 1420, a storage 1430, an input devices 1435 and an output devices 1440. For example, computing system 150 described herein may include one or more computing devices that may be similar to computing device 1400.

Operating system 1415 may be or may include any code segment designed and/or configured to perform tasks involving coordination, scheduling, arbitration, supervising, controlling or otherwise managing operation of computing device 1400, for example, scheduling execution of programs. Operating system 1415 may be a commercial operating system. Memory 1420 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 1420 may be or may include a plurality of, possibly different memory units.

Executable code 1425 may be any executable code, e.g., a unit or module designed to perform a function or method described herein. For example, executable code 1425 may be an application, a process, task or script. Executable code 1425 may be executed by controller 1405 possibly under control of operating system 1415. For example, executable code 1425 may be, or may include units such as classification unit 151, diff-analysis unit 152, pre-classification unit 153, string lookup unit 154, controlled browser 132, baseline generation unit 157 and management unit 158. It will be understood that a plurality of executable code segments may be stored on storage 1430 and, when needed, loaded into memory 1420 and executed by controller 1405. For example, a first executable code segment similar to executable code 1425 may be, may implement or may include string lookup unit 154 and a second executable code segment similar to executable code 1425 may be, may implement or may include baseline generation unit 157. Accordingly, classification unit 151, diff-analysis unit 152, pre-classification unit 153, string lookup unit 154, controlled browser 132, baseline generation unit 157 and management unit 158 may be units or modules included in a system as described herein.

In an embodiment, analysis server 130 is a computing device similar to computing device 1400. In an embodiment, computing system 150 is one or more computing devices similar to computing device 1400. In another embodiment, analysis server is a number of computing devices similar to computing device 1400. For example, any functions, operations or methods described herein with respect to analysis server 130 may be performed by executable code 1425 when executed by controller 1405. Any functions, operations or methods described herein with respect to a web browser or units executed within a web browser in relation with a web browser, e.g., data collector 113, data collector source 137 or any unit included in computing system 150 may be performed by executable code 1425 when executed by controller 1405.

Where applicable, executable code 1425 may carry out operations described herein in real-time. Computing device 1400 and executable code 1425 may be configured to update, process and/or act upon information at the same rate the information, or a relevant event, are received. In some embodiments, more than one computing device 1400 may be used. For example, a plurality of computing devices that include components similar to those included in computing device 1400 may be connected to a network and used as a system. For example, functions or operations performed by any one of classification unit 151, diff-analysis unit 152, pre-classification unit 153, string lookup unit 154, controlled browser 132, baseline generation unit 157 and management unit 158 may be performed, in realtime, by executable code 1425 when executed on one or more computing devices such computing device 1400.

Storage 1430 may be or may include, for example, a hard disk drive, a floppy disk drive, a Compact Disk (CD) drive, a CD-Recordable (CD-R) drive, a universal serial bus (USB) device or other suitable removable and/or fixed storage unit. In an embodiment, storage 170 may be similar to storage 1430. Content may be stored in storage 1430 and may be loaded from storage 1430 into memory 1420 where it may be processed by controller 1405. In some embodiments, some of the components shown in FIG. 14 may be omitted. For example, memory 1420 may be a non-volatile memory having the storage capacity of storage 1430. Accordingly, although shown as a separate component, storage 1430 may be embedded or included in memory 1420.

Input devices 1435 may be or may include a mouse, a keyboard, a touch screen or pad or any suitable input device. It will be recognized that any suitable number of input devices may be operatively connected to computing device 1400 as shown by block 1435. Output devices 1440 may include one or more displays, speakers and/or any other suitable output devices. It will be recognized that any suitable number of output devices may be operatively connected to computing device 1400 as shown by block 1440. Any applicable input/output (I/O) devices may be connected to computing device 1400 as shown by blocks 1435 and 1440. For example, a wired or wireless network interface card (NIC), a modem, printer or facsimile machine, a universal serial bus (USB) device or external hard drive may be included in input devices 1435 and/or output devices 1440.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 1420, computer-executable instructions such as executable code 1425 and a controller such as controller 1405.

Some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Unless explicitly stated, the method embodiments described herein are not constrained to a particular order or sequence. Additionally, some of the described method embodiments or elements thereof can occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A method of classifying a webpage, the method comprising:
producing, by a hardware analysis server computer, a baseline pool, the baseline pool including data, the data including a plurality of normalized string representations of a respective plurality of webpages served by a web server, wherein producing each of a normalized string representation of the plurality of a normalized string representations of a webpage further comprises: for each webpage of the plurality of webpages:
creating an empty output string;
for each element of the webpage:
i) determine if the element is a known element,
ii) if the element is a known element adding the element and its attributes to the empty output string, and
iii) if the element is not a known element, refraining from adding the element to the empty output string; and
setting the corresponding normalized string representation of the current webpage to the empty output string;
obtaining, from a web browser, a string representation of the webpage received by the web browser from the web server; and
producing, by the hardware analysis server, a classification of the webpage by
i) determining a sequence having a maximum string length from all strings in the baseline pool that are a subsequence of the string representation;
ii) selecting a minimal set size of consecutive substrings from the sequence that is required to reconstruct the string representation, and
iii) if any of the substrings in the sequence contain an HTML script tag, an HTML input tag, or a URL having different domain names, then classify the webpage as suspect.

2. The method of claim 1, comprising:
producing, by a unit in the web browser, the string representation of the webpage;
generating, by the unit in the web browser, a unique identification parameter;
sending, by the unit in the web browser, the unique identification parameter to the web server;
sending, by the unit in the web browser, the unique identification parameter and the string representation of the webpage to the analysis server;
producing, by the hardware analysis server, a pre-classification for the webpage based on the string representation of the webpage and storing the pre-classification in association with the unique identification parameter;
sending the unique identification parameter from the web server to the analysis server;
using the unique identification parameter to locate the pre-classification at the analysis server; and
producing the classification based on the pre-classification.

3. The method of claim 1, comprising:
receiving the webpage from the web server by the analysis server;
generating, by the hardware analysis server, a normalized string representation of the webpage as received by the analysis server; and
producing the classification by relating the normalized string representation of the webpage as received by the analysis server to the string representation of the webpage as received by the web browser.

4. The method of claim 2, comprising producing the classification based on determining an element included in the webpage as received by the web browser is not included in the webpage as received by a controlled browser included in the analysis server.

5. The method of claim 2, comprising:
collecting, by the unit in the web browser, device data related to a user computing device;
sending, by the unit in the web browser, the device data to the analysis server; and
using the device data to produce the classification.

6. The method of claim 2, comprising:
collecting, by the unit in the web server, server data related to the web server;
sending the server data to the hardware analysis server; and
using the server data to produce the classification.

7. The method of claim 2, comprising updating the baseline pool based on the string representation of the webpage.

8. The method of claim 1, comprising:
classifying the webpage received by the web browser as unknown; and
based on a frequency of appearance, classifying the webpage received by the web browser as authentic.

9. A system comprising:
an analysis server computer including:
a memory including a baseline pool including data, the data including a plurality of normalized string representations of a respective plurality of webpages served by a web server; and
a controller, the controller configured to:
produce each normalized string representation of the plurality of a normalized string representation by:
create an empty output string;
for each element of the webpage:
i) determine if the element is a known element,
ii) if the element is a known element adding the element and its attributes to the empty output string, and
iii) if the element is not a known element, refraining from adding the element to the empty output string; and
set a normalized string representation of the webpage to the empty output string;
generate a string representation of the webpage, and produce a classification of the webpage by
i) determining a sequence having a maximum string length from all strings in the baseline pool that are a subsequence of the string representation;

ii) selecting a minimal set size of consecutive substrings from the sequence that is required to reconstruct the string representation, and iii) if any of the substrings in the sequence contain an HTML script tag, an HTML input tag, or a URL having different domain names, then classify the webpage as suspect.

10. The system of claim 9, wherein the controller is configured to:
   determine that an element represented in the normalized string representation is not represented in the string representation; and
   classify the webpage as suspicious.

11. The system of claim 9, comprising:
   a unit installed in a user web browser and configured to send a parameter identifying the webpage to the controller and to a web server, the web server serving the webpage; and
   wherein the controller is configured to receive the parameter from the web server and to use the parameter to locate the classification of the webpage.

12. The system of claim 11, wherein:
   the unit in the web browser is configured:
      to collect device data related to a user computing device, and
      send the device data to the controller; and
   wherein the controller is configured to use the device data to produce the classification.

13. The system of claim 9, wherein the controller is configured to:
   classify the webpage as unknown; and
   based on a frequency of appearance, classify the webpage as authentic.

14. The system of claim 9, wherein the controller is configured to:
   generate a baseline pool by obtaining a plurality of webpages using a controlled web browser; and
   classify the webpage based on the baseline pool.

15. The system of claim 11, comprising a unit installed in the web server, the unit configured to:
   collect server data related to the web server, and
   send the server data to the controller; and
   wherein the controller is configured to use the server data to produce the classification.

16. The system of claim 11, wherein:
   the unit installed in the web browser is configured to:
      collect device data related to a user computing device, and
      send the device data to the controller; and
   wherein the controller is configured to use the device data to produce the classification.

* * * * *